(12) United States Patent
Kikuchi et al.

(10) Patent No.: US 7,840,907 B2
(45) Date of Patent: Nov. 23, 2010

(54) INFORMATION PROCESSING APPARATUS, INFORMATION PROCESSING METHOD, AND PROGRAM THEREOF

(75) Inventors: Yuhei Kikuchi, Kanagawa (JP); Takashi Kitao, Tokyo (JP)

(73) Assignee: Sony Corporation, Tokyo (JP)

( * ) Notice: Subject to any disclaimer, the term of this patent is extended or adjusted under 35 U.S.C. 154(b) by 464 days.

(21) Appl. No.: 11/677,255

(22) Filed: Feb. 21, 2007

(65) Prior Publication Data

US 2007/0226652 A1 Sep. 27, 2007

(30) Foreign Application Priority Data

Mar. 23, 2006 (JP) ............................. 2006-081320

(51) Int. Cl.
*G06F 3/048* (2006.01)
*G06F 3/033* (2006.01)
*G09G 5/00* (2006.01)

(52) U.S. Cl. ...................... 715/790; 715/791; 715/792; 715/793; 715/794; 715/779; 715/804; 715/810; 715/821; 715/841; 715/863; 715/839; 345/156

(58) Field of Classification Search ................ 715/782, 715/792, 793, 796, 797, 786, 804, 810, 821, 715/863, 841; 345/156, 901
See application file for complete search history.

(56) References Cited

U.S. PATENT DOCUMENTS

| | | | | |
|---|---|---|---|---|
| 5,123,676 A | * | 6/1992 | Donnelly et al. | 283/37 |
| 5,333,255 A | | 7/1994 | Damouth | |
| 5,592,605 A | * | 1/1997 | Asuma et al. | 715/775 |
| 5,714,973 A | * | 2/1998 | Takahashi et al. | 345/658 |
| 5,835,094 A | * | 11/1998 | Ermel et al. | 715/848 |
| 7,304,635 B2 | * | 12/2007 | Seet et al. | 345/156 |
| 7,614,837 B2 | * | 11/2009 | Anderson et al. | 412/1 |
| 7,657,845 B2 | * | 2/2010 | Drucker et al. | 715/833 |
| 2002/0054164 A1 | * | 5/2002 | Uemura | 345/848 |
| 2002/0080180 A1 | * | 6/2002 | Mander et al. | 345/769 |
| 2005/0138569 A1 | * | 6/2005 | Baxter et al. | 715/788 |
| 2005/0210410 A1 | * | 9/2005 | Ohwa et al. | 715/821 |
| 2005/0240880 A1 | * | 10/2005 | Banks et al. | 715/836 |
| 2005/0289449 A1 | * | 12/2005 | Sapienza et al. | 715/501.1 |
| 2007/0045961 A1 | * | 3/2007 | Morris | 273/292 |
| 2007/0076235 A1 | * | 4/2007 | Murata | 358/1.13 |

FOREIGN PATENT DOCUMENTS

JP 4-316125 11/1992

* cited by examiner

*Primary Examiner*—Dennis-Doon Chow
*Assistant Examiner*—Linh K Pham
(74) *Attorney, Agent, or Firm*—Oblon, Spivak, McClelland, Maier & Neustadt, L.L.P.

(57) ABSTRACT

The present invention provides an information processing apparatus that can make the user easily search for desired data. By mutually superposing and displaying icons of respective plural files and folders, and carrying out the flipping operation for thus superposed and displayed icons, an arbitrary icon is shifted and displayed such that the icon is spread. Accordingly, the operation of searching for a desired icon from among the plural icons can be made more intuitive and comprehensible with a sense of flipping a page of a book. Furthermore, since plural icons indicative of the contents of files and folders corresponding to the respective plural icons are displayed such that the icons are not superposed one another, the user can visually confirm the contents of the respective icons, which makes it possible to easily search for an icon of a desired file or folder, and easily search for desired data consequently.

12 Claims, 24 Drawing Sheets

INFORMATION PROCESSING APPARATUS, INFORMATION PROCESSING METHOD, AND PROGRAM THEREOF

CROSS REFERENCES TO RELATED APPLICATIONS

The present invention contains subject matter related to Japanese Patent Application JP 2006-081320 filed in the Japanese Patent Office on Mar. 23, 2006, the entire contents of which being incorporated herein by reference.

BACKGROUND OF THE INVENTION

1. Field of the Invention

The present invention relates to an information processing apparatus, an information processing method, and a program thereof, which are suitably applied in searching for desired data from plural data.

2. Description of Related Art

In the past, in personal computers being information processing apparatuses, various data are stored and managed as files under folders which are layered logical storage locations built up in a hard disk drive. Most of such personal computers are provided with the Graphical User Interface (GUI) that displays respective folders and files on a display as icons so as to enable the user to operate the icons displayed on the display using a mouse, making it easy to operate the folders (for example, selecting, copying, deleting folders, etc.) as well as to operate the files (for example, selecting, copying, deleting files, etc.).

On the other hand, depending on the storage capacity, personal computers which can store several million files or more are expected to be provided with a GUI that can make the user easily search for a desired file (or data) from among such many files.

In recent years, for example, there is suggested an information processing apparatus that is provided with a GUI that can make the operation of searching for an icon corresponding to a desired file from among a plurality of icons more intuitive and comprehensible by superposing and displaying icons indicative of the contents of files (for example, in case of image files, images thereof) like pages of a book, and spreading and displaying an icon corresponding to a desired file from among thus superposed and displayed icons by the operation of flipping a page (for example, Jpn. Pat. Appln. Laid-Open Publication No. 4-316125, FIG. 7 to FIG. 14).

SUMMARY OF THE INVENTION

When employing above-described conventional GUI, even if the operation of searching for an icon corresponding to a desired file from among plural icons is made more intuitive and comprehensible, since the icons are superposed and displayed, the respective icons are not confirmed before flipping and spreading the icons. As a result, it is hard to say that an icon corresponding to a desired file can be easily searched for from among plural icons. That is, employing the conventional GUI, it is hard to say that the user can easily search for desired data.

It is therefore desirable to overcome the above-mentioned drawbacks by providing an information processing apparatus, an information processing method, and a program thereof which can make the user easily search for desired data.

According to an embodiment of the present invention, there is provided an information processing apparatus, which includes a display control means for mutually superposing and displaying a plurality of selection item display elements indicative of a plurality of selection items respectively on a display unit with a plurality of data and logical storage locations for the plural data being the selection items respectively, and displaying a plurality of item contents display elements indicative of the contents of the selection items corresponding to the respective plural selection item display elements on the display unit such that the contents can be visually confirmed; and an operation means for carrying out a predetermined operation for the superposed and displayed plural selection item display elements; wherein the display control means shifts and displays an arbitrary selection item display element among the superposed and displayed plural selection item display elements based on the predetermined operation by the operation means such that a page of a book is spread.

In this way, according to an embodiment of the present invention, by mutually superposing and displaying a plurality of selection item display elements indicative of a plurality of selection items, which are a plurality of data and logical storage locations for the plural data, respectively, and carrying out a predetermined operation for the superposed and displayed plural selection item display elements, an arbitrary selection item display element among the superposed and displayed plural selection item display elements is shifted and displayed such that a page of a book is spread. Accordingly, the operation of searching for a desired selection item display element from among the plural selection item display elements can be made more intuitive and comprehensible with a sense of flipping a page of a book.

According to an embodiment of the present invention, a plurality of item contents display elements indicative of the contents of the selection items corresponding to the respective superposed and displayed plural selection item display elements are displayed such that the contents can be visually confirmed. Accordingly, even if the respective superposed and displayed plural selection item display elements are not shifted and displayed such that the selection item display elements are spread, the user can visually confirm the contents of the respective selection item display elements.

According to the present invention, by mutually superposing and displaying a plurality of selection item display elements indicative of a plurality of selection items, which are a plurality of data and logical storage locations for the plural data, respectively on a display unit, and carrying out a predetermined operation for the superposed and displayed plural selection item display elements, an arbitrary selection item display element among the superposed and displayed plural selection item display elements is shifted and displayed such that a page of a book is spread. Accordingly, the operation of searching for a desired selection item display element from among the plural selection item display elements can be made more intuitive and comprehensible with a sense of flipping a page of a book. Furthermore, a plurality of item contents display elements indicative of the contents of the selection items corresponding to the respective superposed and displayed plural selection item display elements are displayed such that the contents can be visually confirmed. Accordingly, even if the respective superposed and displayed plural selection item display elements are not shifted and displayed such that the selection item display elements are spread, the user can visually confirm the contents of the respective selection item display elements. As a result, it becomes possible to easily search for a desired selection item display element, which can realize an information processing apparatus, an information processing method, and a program thereof which are capable of easily searching for desired data.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

The configuration of one embodiment according to the present invention will further be described below with reference to the accompanying drawings.

(1) Configuration of Personal Computer

Figure 1:
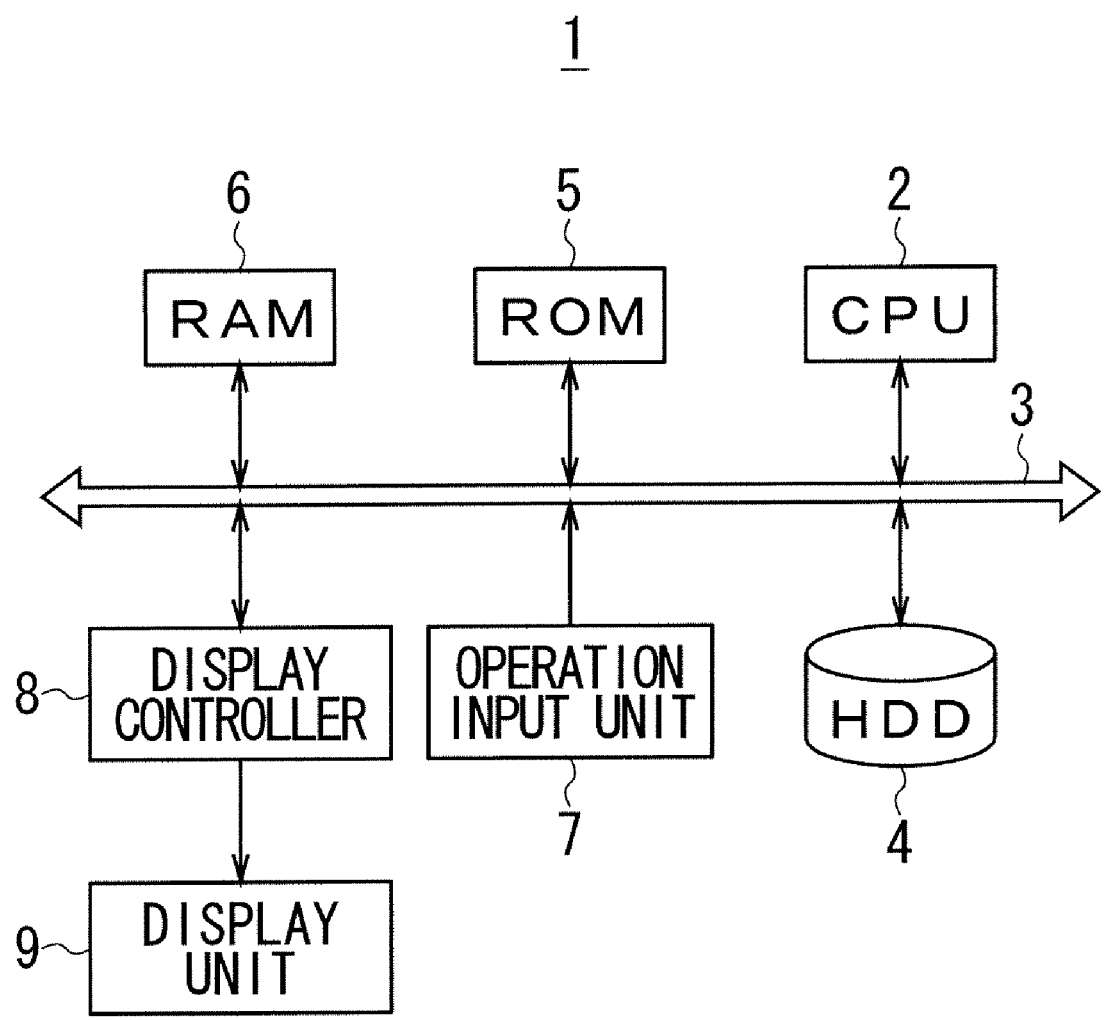
FIG. 1 shows a block diagram indicative of the hardware configuration of a personal computer.

FIG. 1 shows a block diagram indicative of the hardware configuration of a personal computer 1 as a hardware for realizing a GUI that arranges icons of folders (also referred to as folder icons, hereinafter) and icons of files (also referred to as file icons, hereinafter) in a virtual three-dimensional space. In the personal computer 1, a CPU 2 realizes the GUI by expanding the Operating System (OS) and various programs read out from a hard disk drive 4 or a Read Only Memory (ROM) 5, connected to the CPU 2 through a bus 3, in a Random Access Memory (RAM) 6 and executing thus expanded OS and programs. Furthermore, an operation input unit 7 accepts the operation for the GUI, and a display controller 8 displays the screen of the GUI (also referred to as GUI screen, hereinafter) on a display unit 9 under the control of the CPU 2.

The personal computer 1 is so configured as to store and manage files of programs and data under layered folders which are built up in the hard disk drive 4 through the OS.

Figure 2:
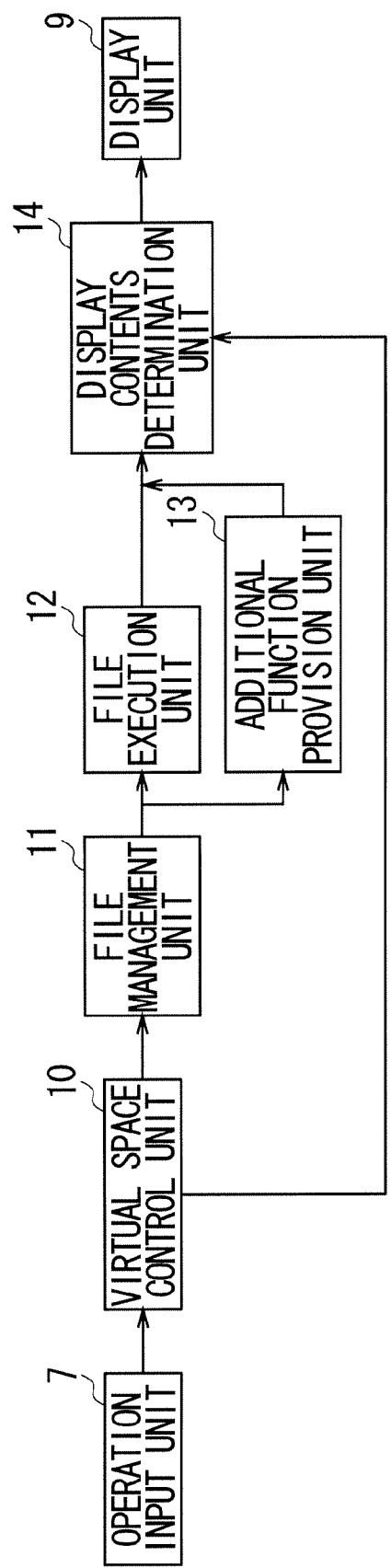
FIG. 2 shows a block diagram indicative of the functional configuration of the personal computer.

FIG. 2 shows a block diagram indicative of the functional configuration of the personal computer 1 that realizes the GUI according to an embodiment of the present invention. In this case, the personal computer 1 includes the operation input unit 7 that accepts an operation input from the user, a virtual space control unit 10 that performs the processing concerning a virtual three-dimensional space, a file management unit 11 that manages folder information concerning folders and file information concerning files in the hard disk drive 4, a file execution unit 12 that executes a file selected by an operation input from the user, an additional function provision unit 13 that provides an additional function (function such as copying, deleting, forming a shortcut) for operating and managing folders and files, a display contents determination unit 14 that determines the display contents to be displayed on the display unit 9 using an operation input from the user etc., and the display unit 9 that actually displays the display contents determined by the display contents determination unit 14

The operation input unit 7 may be a mouse and a keyboard, and, when accepting an operation input from the user, sends information obtained as a result of the operation input (also referred to as operation input information, hereinafter) to the virtual space control unit 10. The operation input information maybe coordinate values (for example, position of the mouse cursor) on a coordinate system (also referred to as screen coordinate system) with respect to the entire screen to be displayed on the display unit 9, information whether or not triggering is performed or not (for example, whether or not the mouse button is clicked), etc.

The virtual space control unit 10 builds up a virtual three-dimensional space, and manages the positions of folder icons and file icons in the three-dimensional space, and information indicative of the position and direction of the view point (also referred to as space information, hereinafter) necessary in displaying the three-dimensional space on the display unit 9. Furthermore, based on operation input information obtained from the operation input unit 7, for example, the virtual space control unit 10 changes the position and direction of the view point indicated in the space information according to the shifting of the mouse cursor, and judges whether or not a folder icon or a file icon exists at a position where the mouse button is clicked (that is, whether or not a folder icon or a file icon is clicked). The virtual space control unit 10 sends information indicative of the result of the judgment (also referred to as click judgment information, hereinafter) to the file management unit 11, and sends the space information to the display contents determination unit 14.

In case the click judgment information sent from the virtual space control unit 10 indicates that, for example, a file icon is clicked, the file management unit 11 writes the notice of selected file to file information of a file corresponding to the clicked file icon, and sends the file information to the file execution unit 12 and to the additional function provision unit 13. On the other hand, in case the click judgment information indicates that, for example, a folder icon is clicked, the file management unit 11 writes the notice of selected folder to folder information of a folder corresponding to the clicked folder icon, and sends the folder information to the additional function provision unit 13.

Based on the file information sent from the file management unit 11, the file execution unit 12 recognizes the selected file and executes the selected file. As a result, for example, in case the selected file is a music file, music based on the music file is reproduced. At this time, by notifying the display contents determination unit 14 that a music file is reproduced, the file management unit 11 makes the display unit 9 displays a screen corresponding to the reproduction of the music file. On the other hand, for example, in case the selected file is an image file, the file management unit 11 makes the display unit 9 displays an image based on the image file through the display contents determination unit 14. Furthermore, in case the selected file is a document file, the file management unit 11 makes the display unit 9 displays a document based on the document file with the document state set editable through the display contents determination unit 14.

Based on the folder information and file information sent from the file management unit 11, the additional function provision unit 13 executes the processing corresponding to the copying, deleting, forming a shortcut, etc. being additional functions for the selected folder and selected file. At this time, the additional function provision unit 13 notifies the display contents determination unit 14 that the processing corresponding to an additional function is executed.

Based on the space information sent from the virtual space control unit 10 and the notifications sent from the file execution unit 12 and additional function provision unit 13, the display contents determination unit 14 determines the contents to be displayed on the display unit 9, and carries out the processing of displaying a GUI screen based on thus determined contents.

The virtual space control unit 10, file management unit 11, file execution unit 12, additional function provision unit 13, and display contents determination unit 14 are configured by blocking a function related to controlling the GUI from among functions of the CPU 2 and display controller 8.

(2) Configuration of GUI Screen

Figure 3:
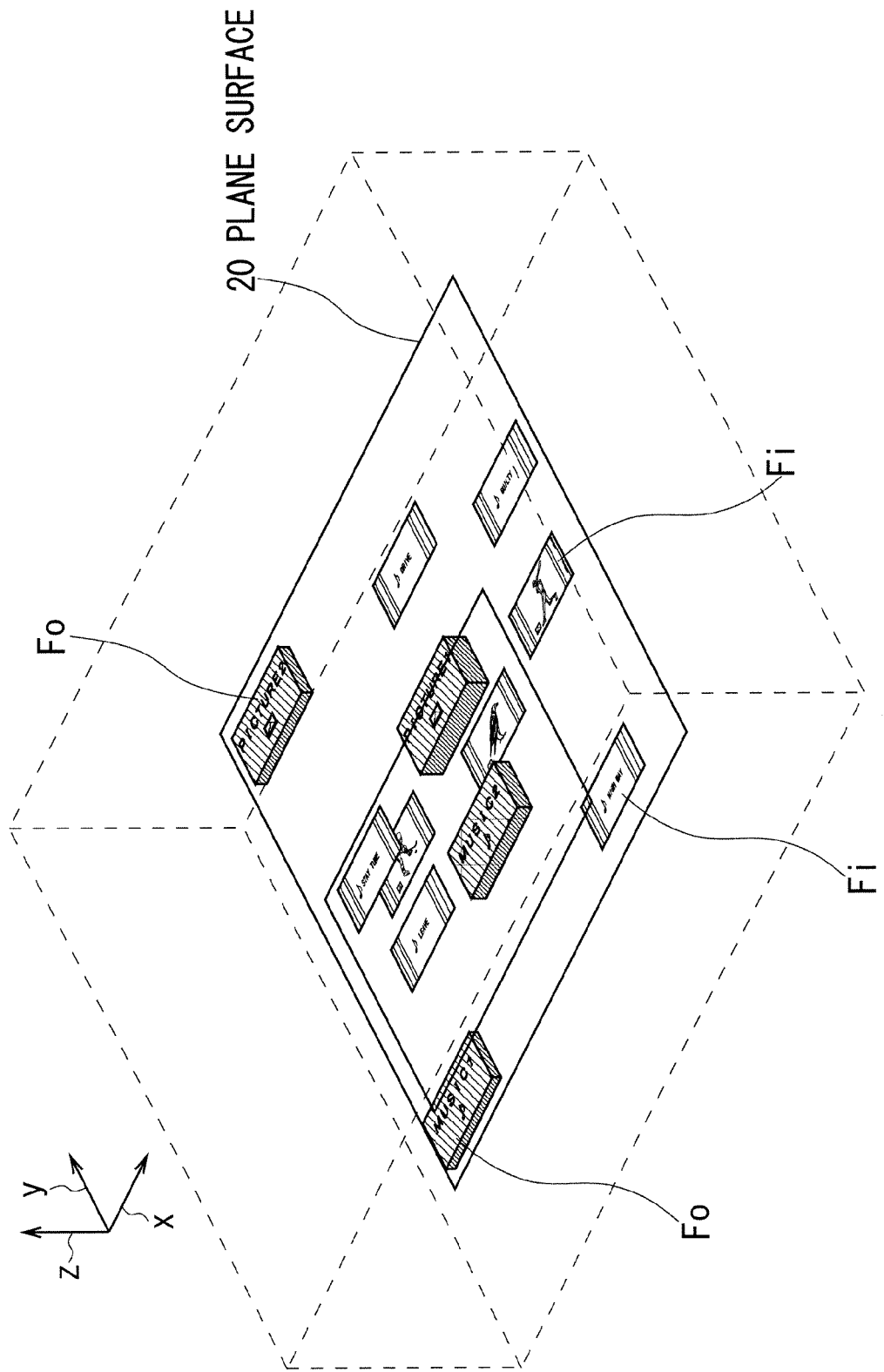
FIG. 3 shows a schematic view of a virtual three-dimensional space.

Next, the configuration of a GUI screen to be displayed on the display unit 9 of the personal computer 1 will be explained. Firstly, as shown in FIG. 3, the CPU 2 of the personal computer 1 builds up a virtual three-dimensional space on the basis of three axes (X-axis, Y-axis, and Z-axis) which are perpendicular to each other and the intersection point thereof, and arranges a plane surface 20 simulating a desk parallel with the X-axis and Y-axis in the three-dimensional space. In this case, the width direction of the desk corresponds to the X-axis direction, the depth direction of the desk corresponds to the Y-axis direction, and the height direction of the desk corresponds to the Z-axis direction.

Furthermore, on the plane surface 20, the CPU 2 arranges horizontally long folder icons Fo simulating books corresponding to respective folders in the personal computer 1 and horizontally long file icons Fi simulating papers corresponding to respective files in the personal computer 1.

Figure 4:
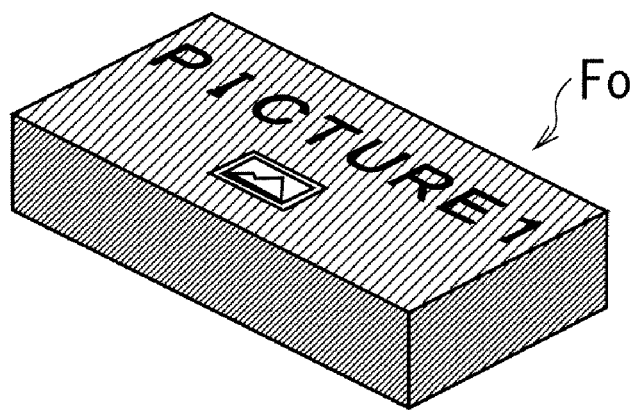
FIG. 4 shows a schematic view of a folder icon.

The folder icons Fo arranged on the plane surface 20 are icons corresponding to respective plural folders selected randomly from among all the folders in the personal computer 1, each of which has attached to the surface thereof a folder name, as shown in FIG. 4. Furthermore, each of the folder icons Fo has a thickness according to the number of files stored in a corresponding folder. That is, each of the folder icons Fo indicates the number of files stored in a corresponding folder by means of the thickness thereof.

Figure 5A:
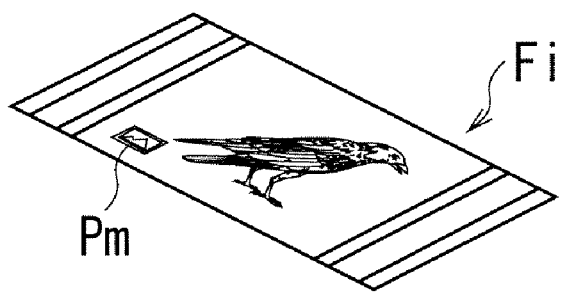
FIG. 5A and FIG. 5B show schematic views of a file icon.
Figure 5B:
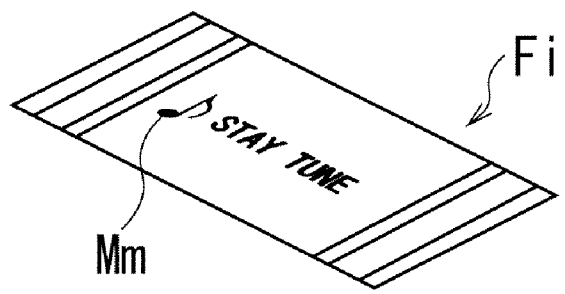

On the other hand, the file icons Fi arranged on the plane surface 20 are icons corresponding to respective plural files selected randomly from among all the files in the personal computer 1, each of which has attached to the surface thereof an image and characters from which the contents of a corresponding file can be confirmed, as shown in FIG. 5A and FIG. 5B. For example, each of file icons Fi corresponding to image files has attached to the surface thereof a mark Pm indicative of an image file and a thumbnail image based on the image file, while each of file icons Fi corresponding to music files has attached to the surface thereof a mark Mm indicative of a music file and a title of music and artist name based on the music file.

Figure 6:
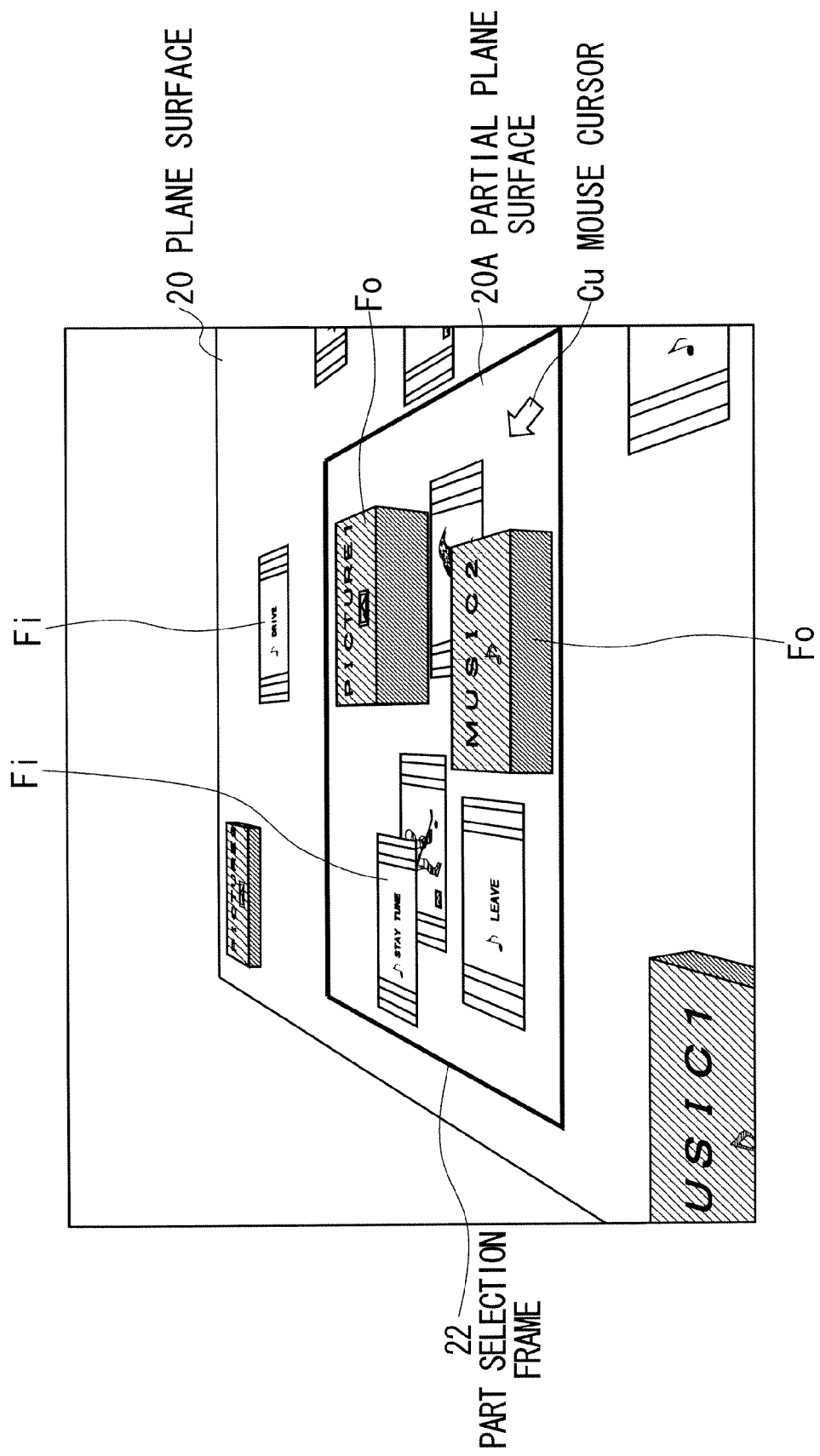
FIG. 6 shows a schematic view of a GUI screen in an over look mode.

In this way, when the plane surface 20 and the plural folder icons Fo and file icons Fi are arranged in the virtual three-dimensional space, next, by setting the position of the view point with respect to the three-dimensional space to a front side upper position of the plane surface 20, and setting the direction of the view point to an oblique downward direction going from the front side to the back side of the plane surface 20, the CPU 2 converts the three-dimensional space to a three-dimensional image looked on from the view point, as shown in FIG. 6, and displays thus converted three-dimensional image on the display unit 9 through the display controller 8 as a GUI screen 21. Accordingly, the GUI screen 21 in this case is the three-dimensional image that is obtained by looking down at the plane surface 20 obliquely from the front side of the plane surface 20. The state in which the three-dimensional image shown in FIG. 6 is displayed as the GUI screen 21 is referred to as an over look mode, hereinafter.

In this over look mode, the CPU 2 displays a quadrangular frame (also referred to as part selection frame, hereinafter) 22, which is adapted to select part of the plane surface 20 in the GUI screen 21, on the plane surface 20, and shifts the part selection frame 22 on the plane surface 20 according to the shifting of a mouse cursor Cu, and selects part of the plane surface 20 enclosed by the part selection frame 22 according to the click (click at a position where the mouse cursor Cu is not superposed on the folder icons Fo or file icons Fi) of the mouse button. Part of the plane surface 20 enclosed by the part selection frame 22 is referred to as a partial plane surface 20A.

Figure 7:
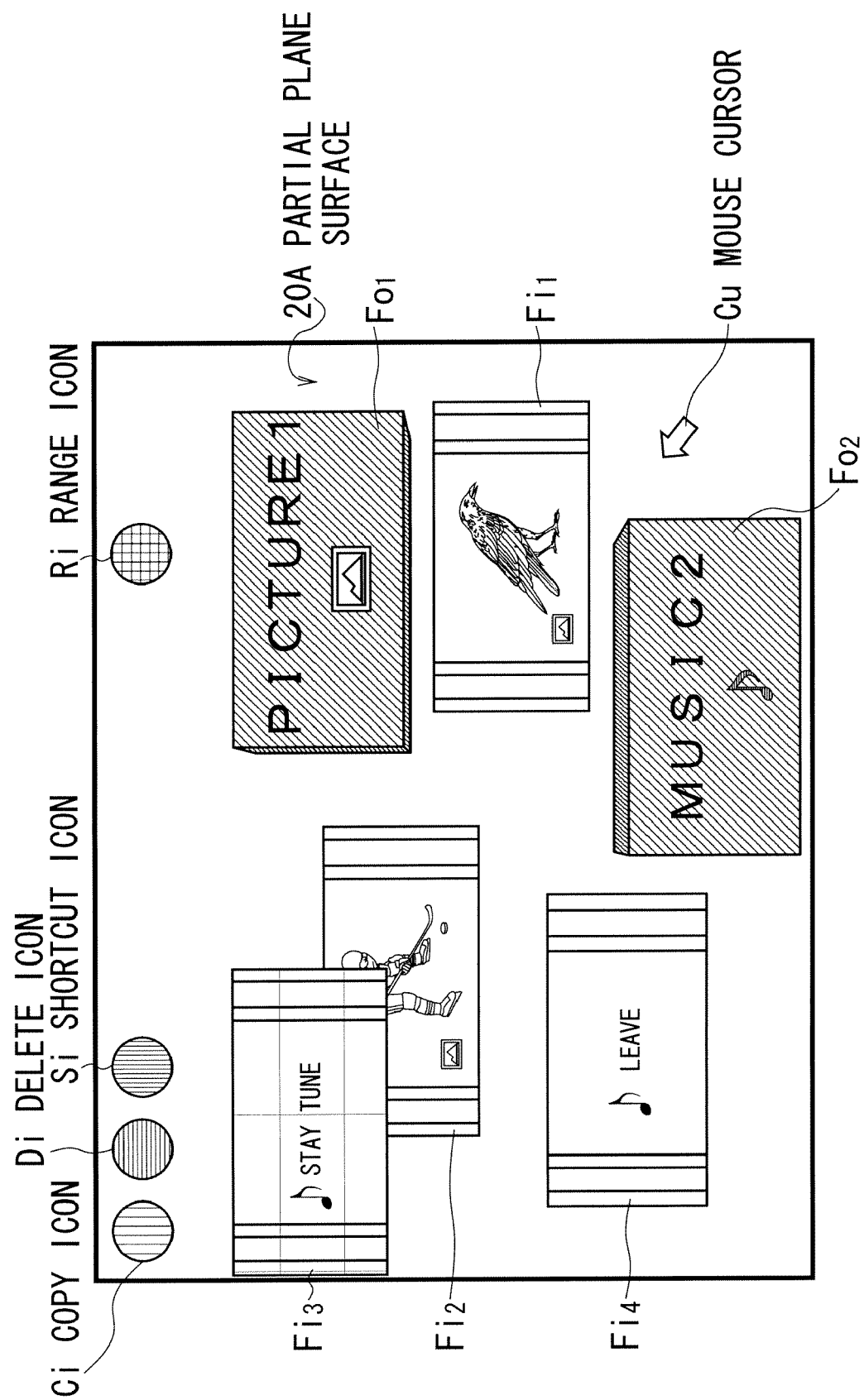
FIG. 7 shows a schematic view of a GUI screen in an approach mode.

When it is recognized that the partial plane surface 20A is selected, by changing the position of the view point with respect to the three-dimensional space to an upper position over the center of the selected partial plane surface 20A (in this case, a position near the plane surface 20 as compared with the case of the over look mode), and changing the direction of the view point to the directly downward direction, the CPU 2 changes the GUI screen 21 to a three-dimensional image looked on from the view point, as shown in FIG. 7. Accordingly, the GUI screen 21 in this case is a three-dimensional image that is obtained by enlarging the selected partial plane surface 20A and looking down at the enlarged partial plane surface 20A from directly above. FIG. 7 shows an example of selecting part where two folder icons $Fo_1$, $Fo_2$ and four file icons $Fi_1$ to $Fi_4$ are arranged as the partial plane surface 20A, in which the file icon $Fi_1$ and file icon $Fi_2$ are icons corresponding to image files and the file icon $Fi_3$ and file icon $Fi_4$ are icons corresponding to music files. The state in which the three-dimensional image shown in FIG. 7 is displayed as the GUI screen 21 is referred to as an approach mode, hereinafter.

In this way, on the GUI screen 21 in the approach mode, since a three-dimensional image that is obtained by enlarging desired part of the plane surface 20 and looking down at thus enlarged part of the plane surface 20 from directly above is displayed, folder names attached to the surfaces of the folder icons Fo, and images and characters indicative of the contents of files attached to the surfaces of the file icons Fi can be easily confirmed by the user.

Furthermore, in the approach mode, the CPU 2 displays, at corners on the partial plane surface 20A in the GUI screen 21, for example, an icon (also referred to as copy icon, hereinafter) Ci to which copying is allocated as an additional function, an icon (also referred to as delete icon, hereinafter) Di to which deleting is allocated as an additional function, an icon (also referred to as shortcut icon, hereinafter) Si to which forming a shortcut is allocated as an additional function, and an icon (also referred to as range icon, hereinafter) Ri to which ranging files or folders is allocated as an additional function.

Figure 8:
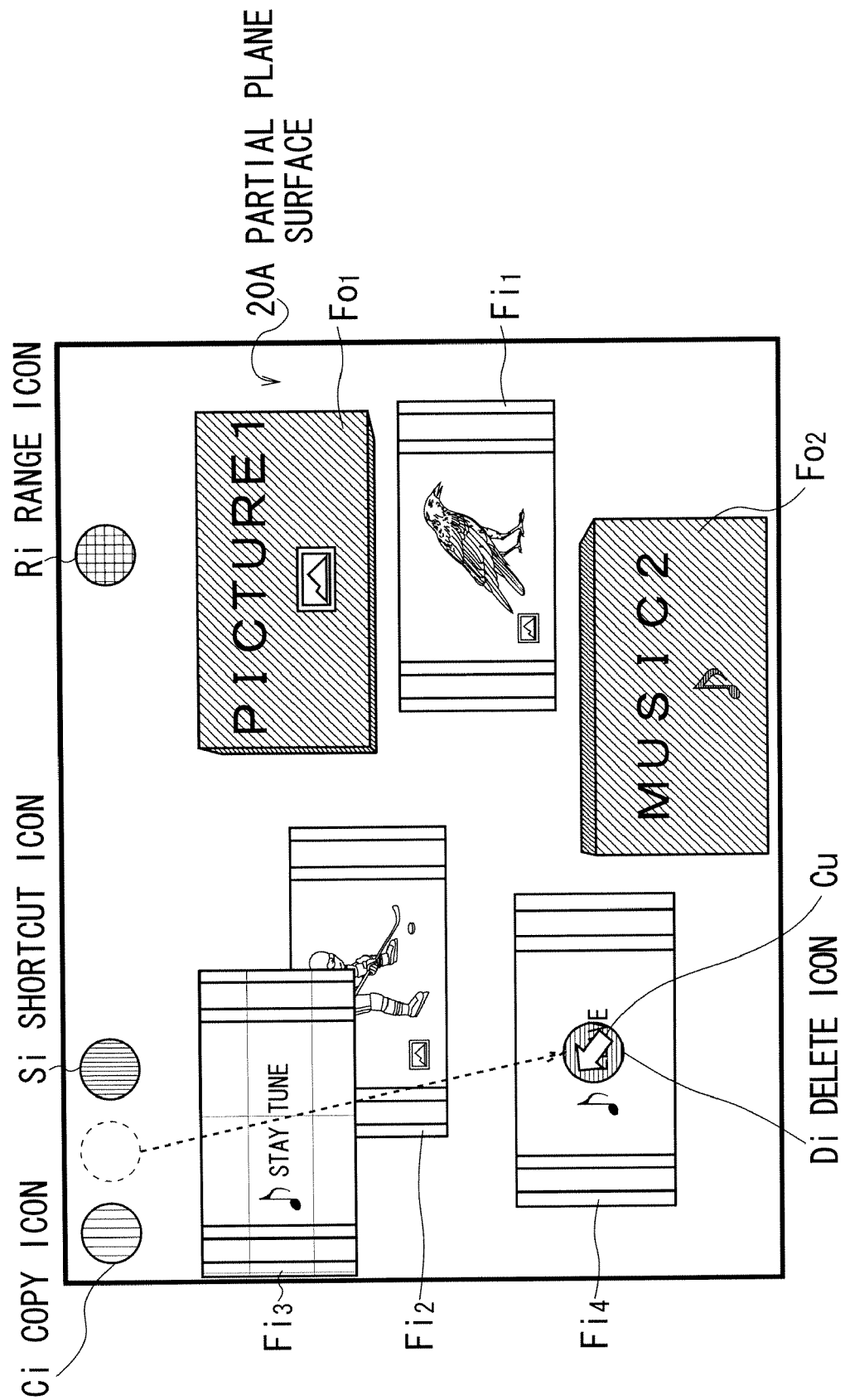
FIG. 8 shows a schematic view of the GUI screen in the approach mode.
Figure 9:
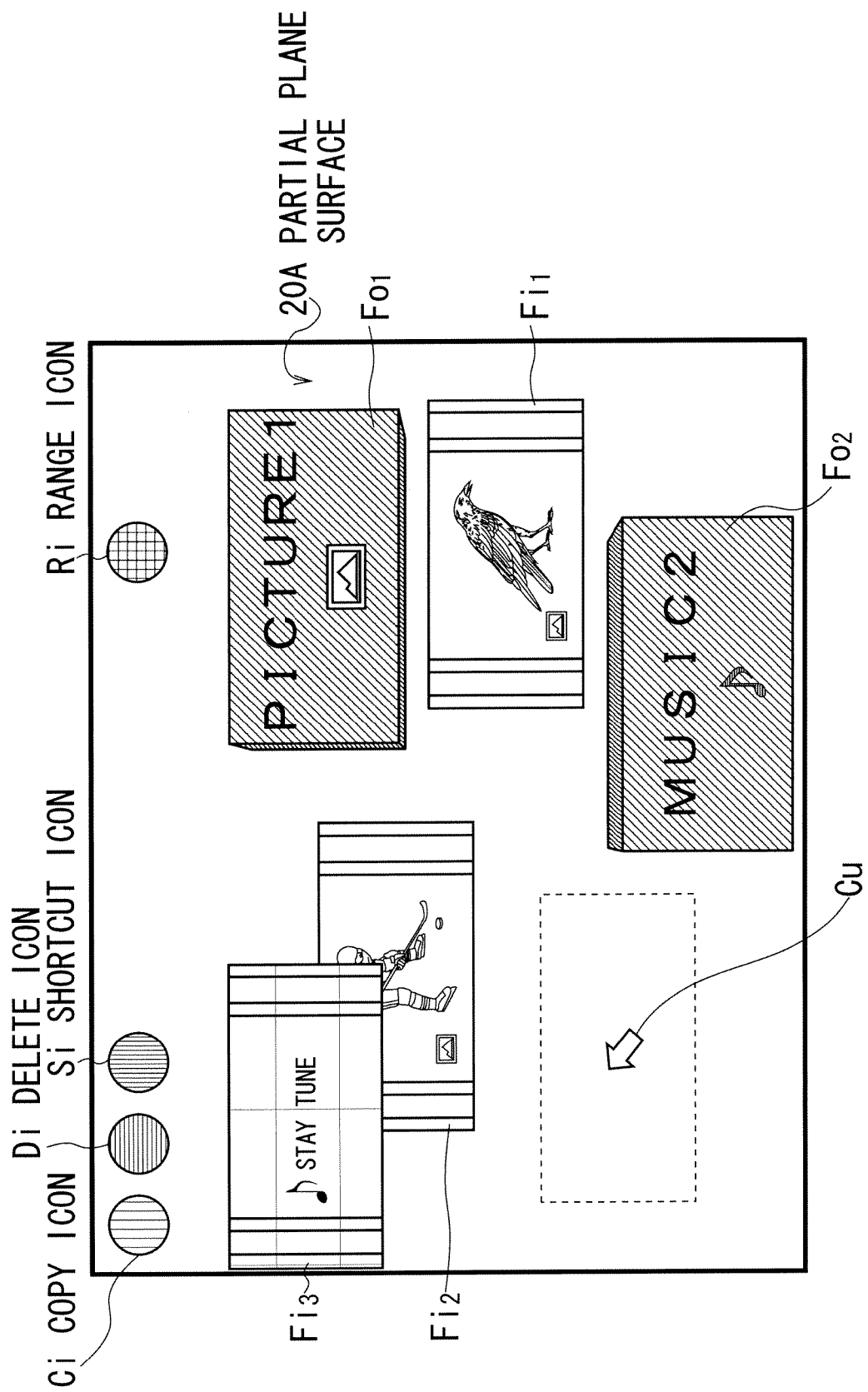
FIG. 9 shows a schematic view of the GUI screen in the approach mode.

When it is recognized that the delete icon Di undergoes the drag and drop on the file icon $Fi_4$ in the GUI screen 21 by the operation of a mouse, as shown in FIG. 8, the CPU 2 executes an additional function allocated to the delete icon Di for a file corresponding to the file icon $Fi_4$. That is, in this case, with respect to a file corresponding to the file icon $Fi_4$, deleting that is an additional function allocated to the delete icon Di is executed. As a result, a file corresponding to the file icon $Fi_4$ is deleted from the personal computer 1, and the file icon $Fi_4$ is deleted from the GUI screen 21, as shown in FIG. 9. Furthermore, after deleting a file is carried out, the delete icon Di is made to return to the original position.

Hereinafter, the operation of carrying out the drag and drop for the copy icon Ci, delete icon Di, shortcut icon Si, and range icon Ri, to which additional functions are allocated, on the folder icons Fo or file icons Fi is referred to as pasting. Furthermore, the copy icon Ci, delete icon Di, shortcut icon Si, and range icon Ri are also referred to as additional function icons collectively.

In this way, on the GUI screen 21 in the approach mode, by a simple operation of pasting an additional function icon to the file icon Fi or folder icon Fo, an additional function allocated to the additional function icon can be carried out for the file icon Fi or folder icon Fo to which the additional function icon is pasted.

Figure 10:
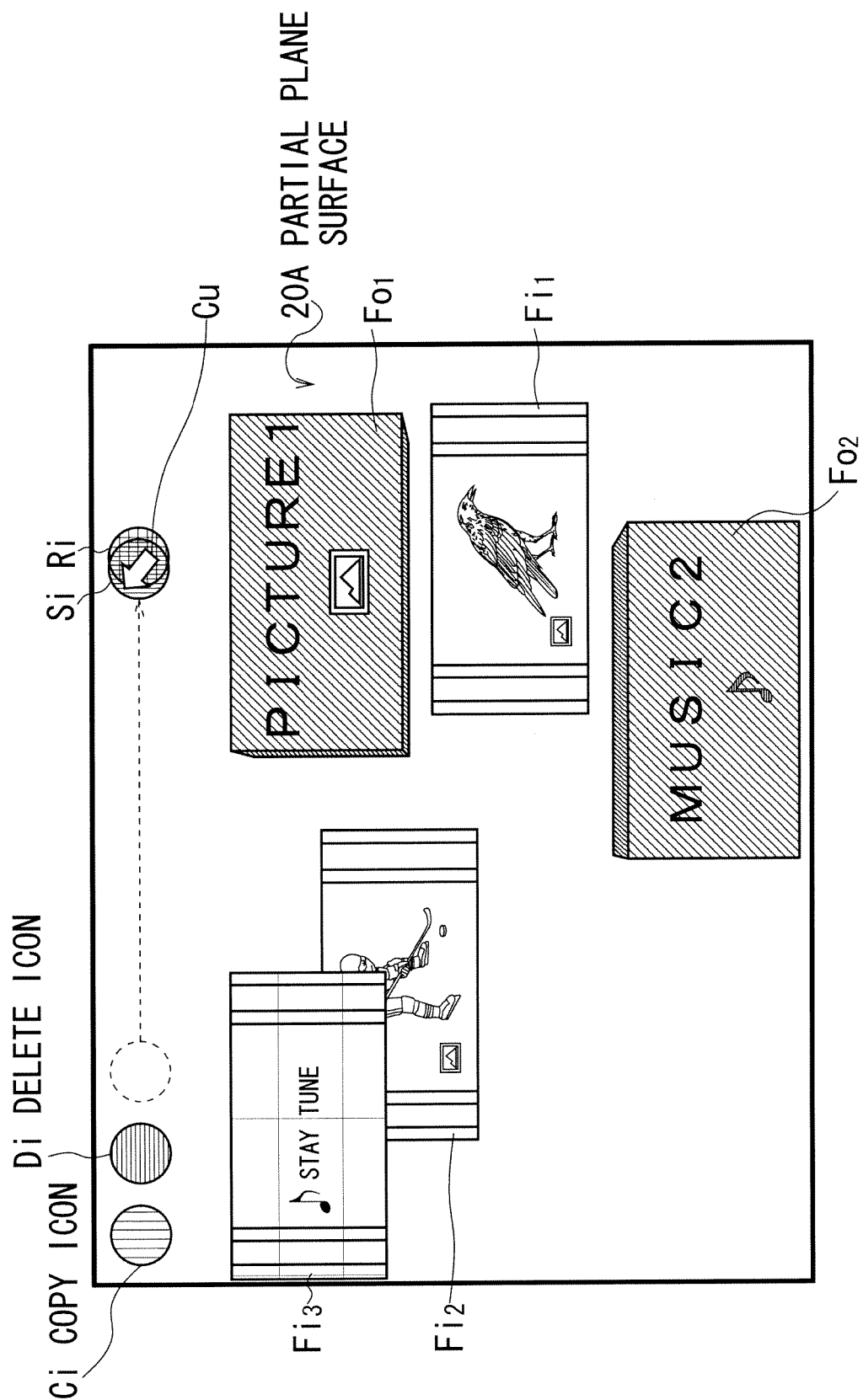
FIG. 10 shows a schematic view of the GUI screen in the approach mode.
Figure 11:
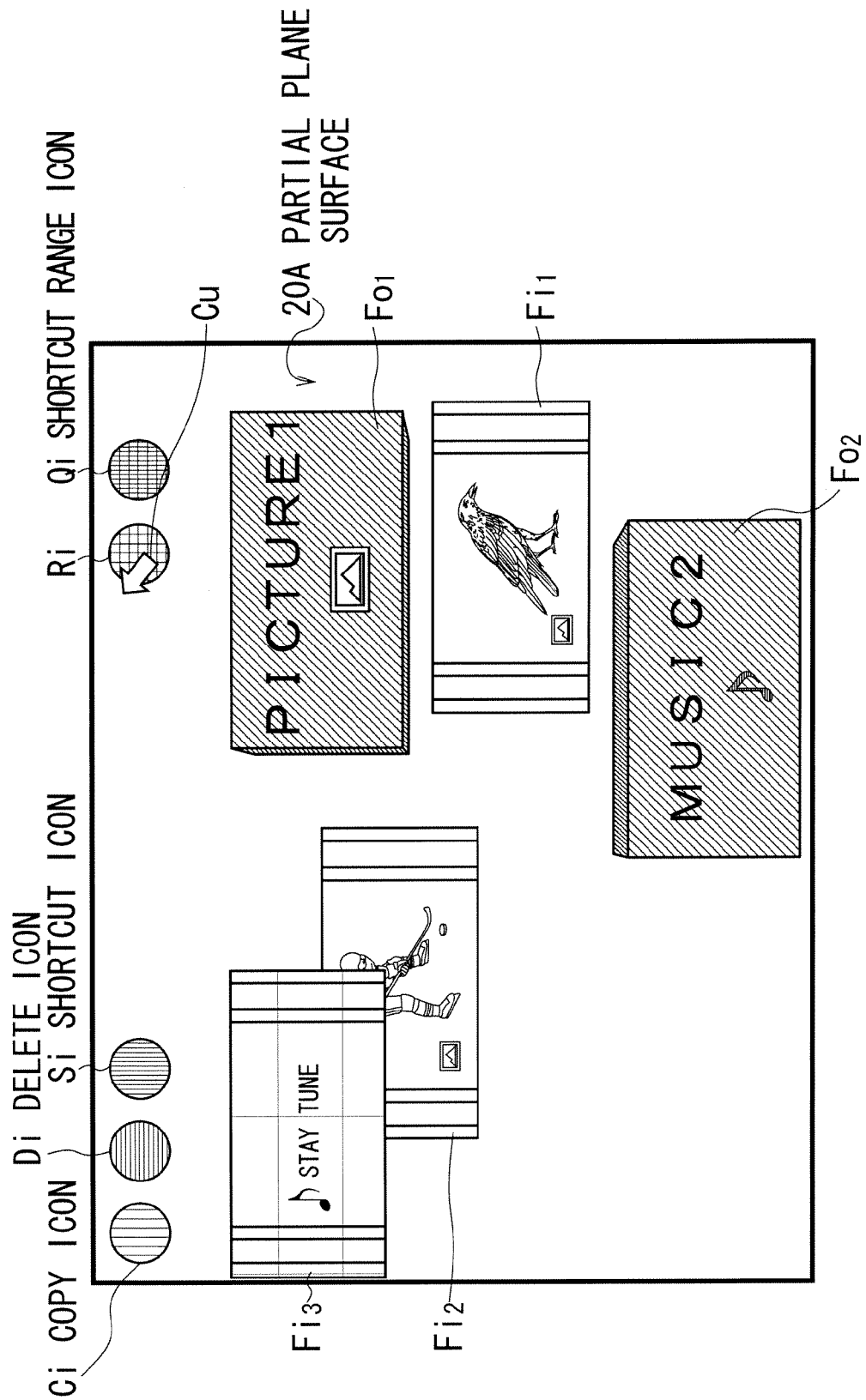
FIG. 11 shows a schematic view of the GUI screen in the approach mode.

Furthermore, in the approach mode, when it is recognized that the shortcut icon Si is pasted to the range icon Ri in the GUI screen 21 by the operation of a mouse, as shown in FIG. 10, the CPU 2 generates a new icon (also referred to as shortcut range icon, hereinafter) Qi to which an additional function combining the additional function allocated to the shortcut icon Si and the additional function allocated to the range icon Ri is allocated, and displays thus generated icon Qi on the GUI screen 21, as shown in FIG. 11. That is, in this case, the shortcut range icon Qi comes to be an icon to which a new additional function of ranging files and folders, and forming a shortcut is allocated.

In this way, on the GUI screen 21 in the approach mode, by a simple operation of pasting one additional function icon to another additional function icon, an additional function icon having a new additional function that combines an additional function allocated to one additional function icon and an additional function allocated to another additional function icon can be generated.

Figure 12:
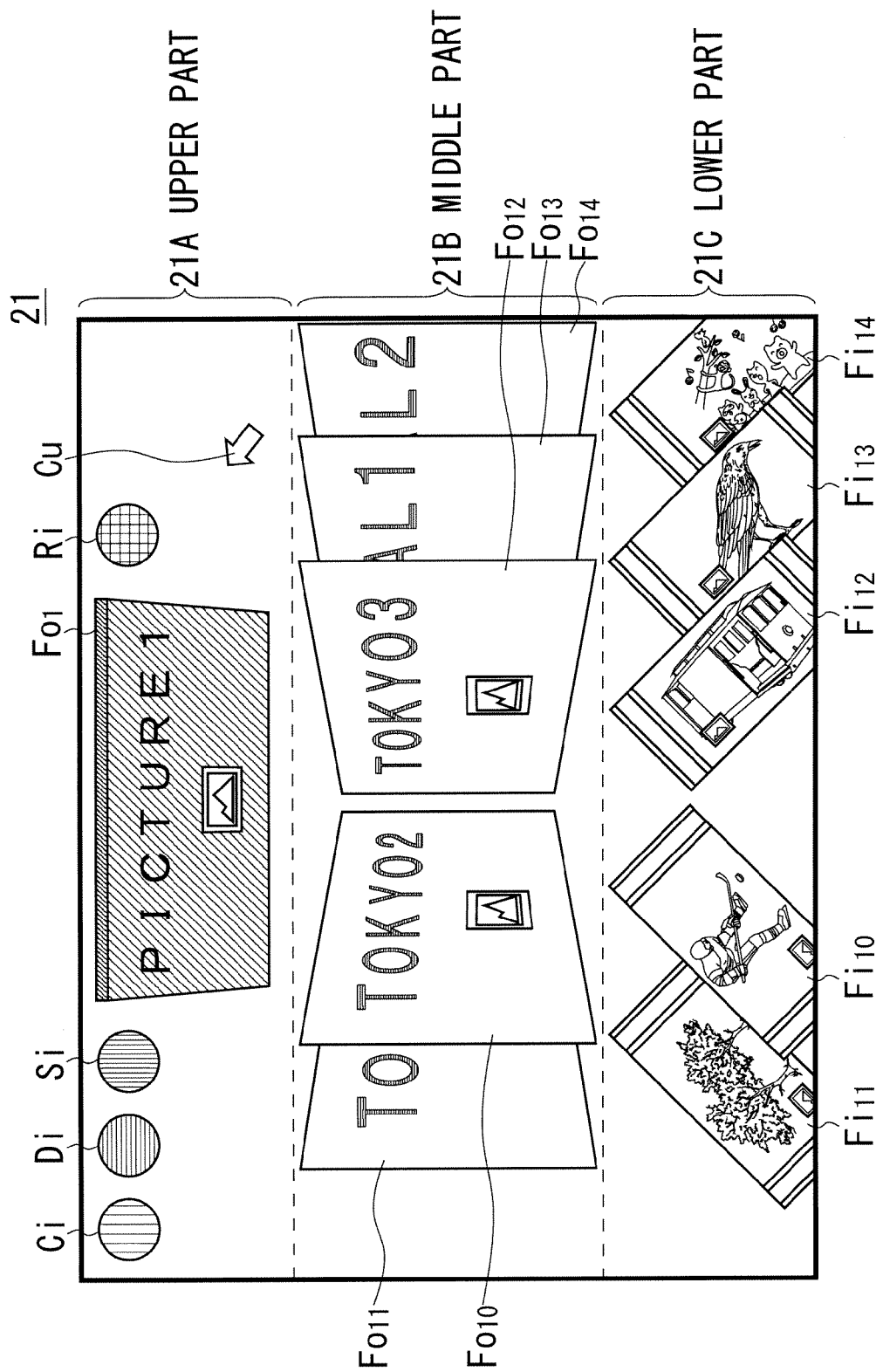
FIG. 12 shows a schematic view of a GUI screen in a folder detail mode.

Furthermore, in the approach mode, for example, when it is recognized that the folder icon $Fo_1$ is selected by the operation of a mouse, the CPU 2 transfers to a folder detail mode. In the folder detail mode, the GUI screen 21 is sectionalized into an upper part 21A, a middle part 21B, and a lower part 21C, as shown in FIG. 12. On the upper part 21A, at the center thereof, a selected folder icon Fo (for example, the folder icon $Fo_1$) is displayed, and the additional function icons (for example, the copy icon Ci, delete icon Di, shortcut icon Si, and range icon Ri) are displayed at both sides of the folder icon Fo.

On the middle part 21B of the GUI screen 21, the plural file icons Fi and folder icons Fo corresponding to respective plural files and folders stored directly under (that is, a lower layer by one) a folder corresponding to the selected folder icon Fo are arrayed and displayed with the center line, not shown, dividing the GUI screen 21 into the left and right being the border such that parts of the file icons Fi and folder icons Fo are superposed in the left direction and in the right direction from the center line. On the middle part 21B, the folder icons Fo are so displayed as to simulate papers similar to the file icons Fi. That is, on the middle part 21B, the plural file icons Fi and folder icons Fo simulating pages of a book are displayed such that pages of a book are spread with the center line simulating the center binding portion of a book being the border. The plural file icons Fi and folder icons Fo displayed on the middle part 21B are icons which can be selected by the mouse operation.

Actually, FIG. 12 shows an example in which, a folder icon $Fo_{10}$ and a folder icon $Fo_{11}$ are arrayed and displayed in the left direction from the center line such that the folder icon $Fo_{10}$ is superposed on part of the folder icon $Fo_{11}$, while a folder icon $Fo_{12}$, a folder icon $Fo_{13}$, and a folder icon $Fo_{14}$ are arrayed and displayed in the right direction from the center line such that the folder icon $Fo_{12}$ is superposed on part of the folder icon $Fo_{13}$, and the folder icon $Fo_{13}$ is superposed on part of the folder icon $Fo_{14}$. That is, in this case, of the folder icons $Fo_{10}$, $Fo_{11}$, $Fo_{12}$, $Fo_{13}$, and $Fo_{14}$, which simulates pages of a book, the folder icon $Fo_{10}$ and folder icon $Fo_{12}$ closest to the center line are so displayed as to form a double spread.

On the lower part 21C of the GUI screen 21, below the respective folder icons $Fo_{10}$, $Fo_{11}$, $Fo_{12}$, $Fo_{13}$, and $Fo_{14}$ displayed on the middle part 21B, icons indicative of the contents of folders corresponding to the respective folder icons $Fo_{10}$, $Fo_{11}$, $Fo_{12}$, $Fo_{13}$, and $Fo_{14}$ are displayed. In this case, for example, an icon indicative of the contents of a folder is a folder icon Fo or file icon Fi corresponding to one of plural folders and files stored directly under (that is, a lower layer by one) a folder. The condition of selecting one folder or file from among plural folders and files is determined by the highest frequency in use, random selection, head or end when sorted in alphabetic order, user setting basis, etc.

Actually, FIG. 12 shows an example in which, below the folder icon $Fo_{10}$, a file icon $Fi_{10}$ corresponding to one of plural folders and files stored directly under a folder corresponding to the folder icon $Fo_{10}$ is displayed, and below the folder icon $Fo_11$, a file icon Fi11 corresponding to one of plural folders and files stored directly under a folder corresponding to the folder icon $Fo_11$ is displayed, and below the folder icon $Fo_{12}$, a file icon $Fi_{12}$ corresponding to one of plural folders and files stored directly under a folder corresponding to the folder icon $Fo_{12}$ is displayed, and below the folder icon $Fo_{13}$, a file icon $Fi_{13}$ corresponding to one of plural folders and files stored directly under a folder corresponding to the folder icon $Fo_{13}$ is displayed, and below the folder icon $Fo_{14}$, a file icon $Fi_{14}$ corresponding to one of plural folders and files stored directly under a folder corresponding to the folder icon $Fo_{14}$ is displayed.

Furthermore, the file icons $Fi_{10}$, $Fi_{11}$, $Fi_{12}$, $Fi_{13}$, and $Fi_{14}$ displayed on the middle part 21C have their sizes made small as compared with those of the icons displayed on the middle part 21B and are inclined by 45 degrees such that the file icons are not superposed one another. At this time, corresponding to the double spread formed by the folder icons $Fo_{10}$, $Fo_{11}$, $Fo_{12}$, $Fo_{13}$, and $Fo_{14}$ displayed on the middle part 21B, the file icons $Fi_{10}$, $Fi_{11}$ located on the left side of the center line, not shown, are inclined by 45 degrees counterclockwise, while the file icons $Fi_{12}$, $Fi_{13}$, $Fi_{14}$ located on the right side of the center line are inclined by 45 degrees clockwise.

Figure 13:
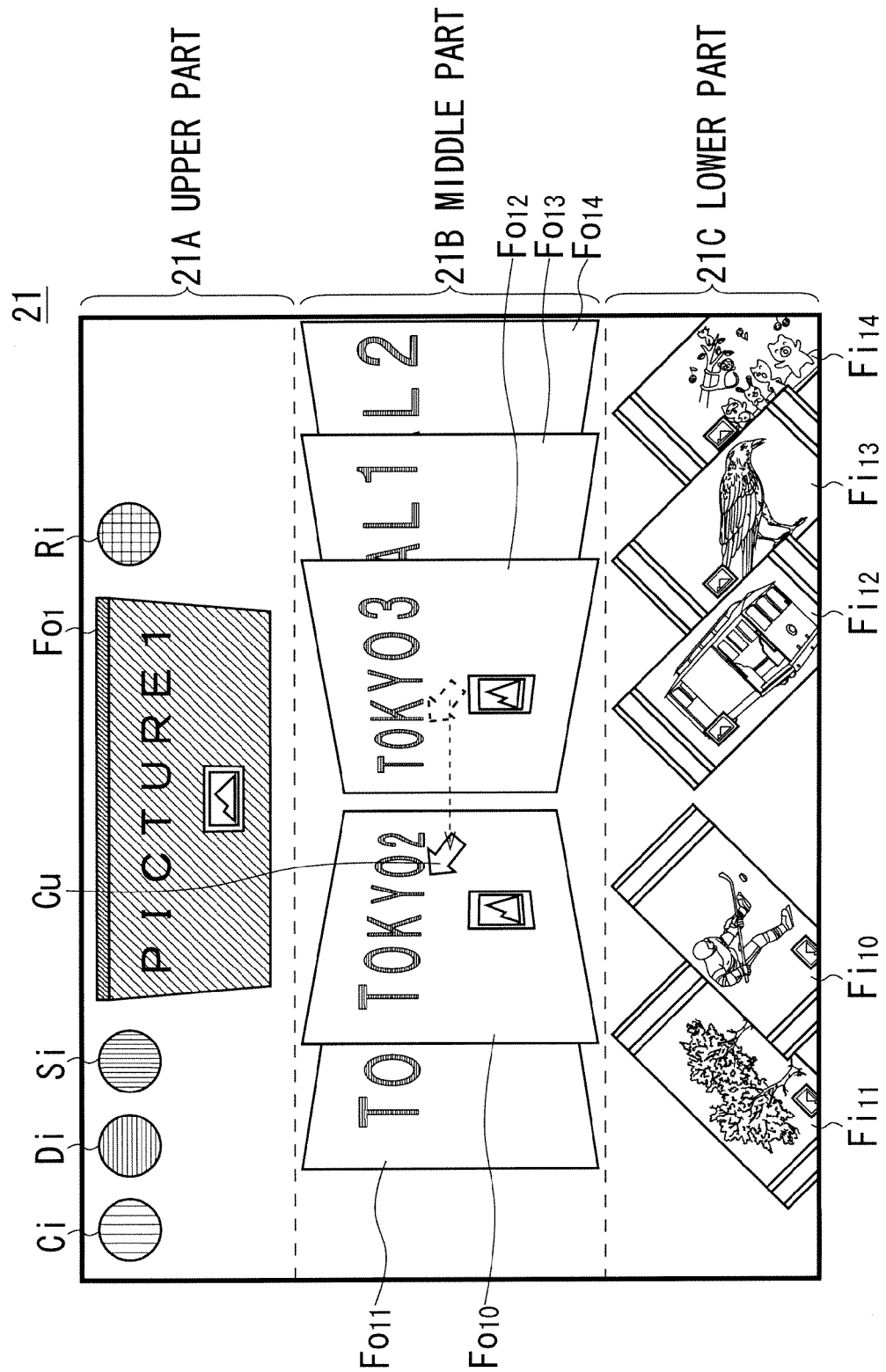
FIG. 13 shows a schematic view of the GUI screen in the folder detail mode.
Figure 14:
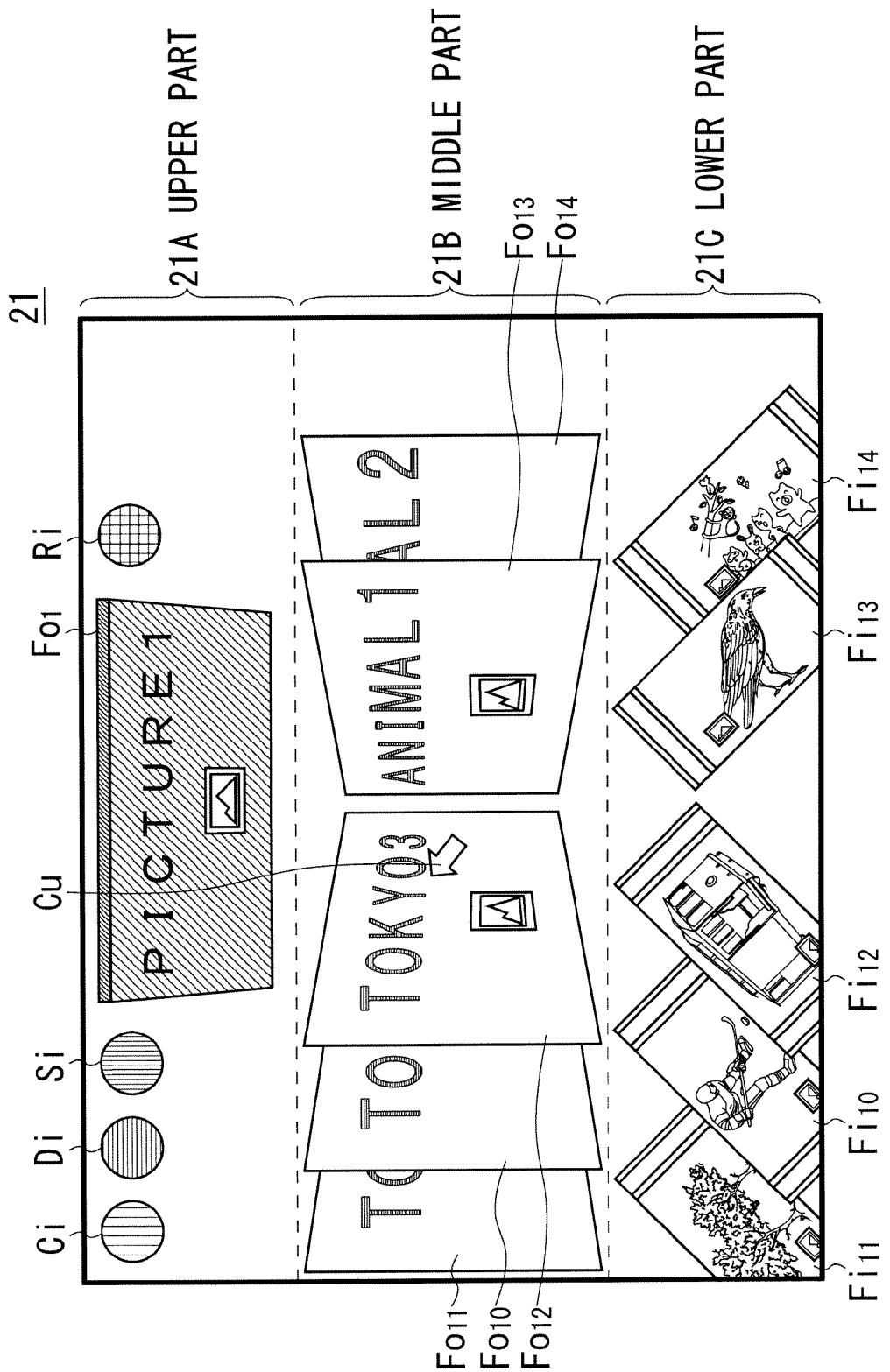
FIG. 14 shows a schematic view of the GUI screen in the folder detail mode.

Furthermore, for example, in the folder detail mode, when it is recognized that the mouse cursor Cu is made to shift from the right side to the left side of the center line in the middle part 21B, as shown in FIG. 13, the CPU 2 shifts the folder icons $Fo_{12}$ to the left side of the center line such that a page of a book is flipped, and shifts the folder icon $Fo_{10}$ and folder icon $Fo_{11}$ in the left direction away from the center line by a distance by which the folder icons $Fo_{12}$ is shifted to the left side of the center line, and shifts the folder icon $Fo_{13}$ and folder icon $Fo_{14}$ in the left direction to make the folder icons $Fo_{13}$, $Fo_{14}$ get close to the center line, as shown in FIG. 14. Hereinafter, the operation of shifting the folder icon Fo and file icon Fi displayed on the middle part 21B from the right side to the left side or from the left side to the right side of the center line is referred to as flipping operation.

As a result, on the middle part 21B, the folder icon $Fo_{12}$, folder icon $Fo_{10}$, and folder icon $Fo_{11}$ are arrayed and displayed in the left direction from the center line such that the folder icon $Fo_{12}$ is superposed on part of the folder icon $Fo_{10}$, and the folder icon $Fo_{10}$ is superposed on part of the folder icon $Fo_{11}$, while the folder icon $Fo_{13}$ and folder icon $Fo_{14}$ are arrayed and displayed in the right direction from the center line such that the folder icon $Fo_{13}$ is superposed on part of the folder icon $Fo_{14}$. That is, in this case, the folder icon $Fo_{12}$ and folder icon $Fo_{13}$ closest to the center line are so displayed as to form a double spread.

In this way, when the flipping operation is carried out for the folder icon $Fo_{12}$, corresponding to the shifting of the folder icons $Fo_{10}$ to $Fo_{14}$ due to the flipping operation, the CPU 2 shifts the file icons $Fi_{10}$ to $Fi_{14}$ displayed on the lower part 21C. That is, the respective folder icons $Fo_{10}$ to $Fo_{14}$ and the respective file icons $Fi_{10}$ to $Fi_{14}$ are vertically arrayed and displayed constantly in this order. Furthermore, at this time, the CPU 2 changes the inclination direction of the file icons $Fi_{12}$, which is shifted from the right side to the left side of the center line corresponding to the shifting of the folder icons $Fo_{12}$, from the clockwise direction to the counterclockwise direction.

In this way, on the GUI screen 21 in the folder detail mode, since the folder icons $Fo_{10}$ to $Fo_{14}$ corresponding to respective plural folders stored directly under a folder corresponding to the selected folder icon Fo are superposed and displayed like pages of a book, and an arbitrary folder icon Fo among the folder icons $Fo_{10}$ to $Fo_{14}$ is so shifted and displayed as to form a double spread by carrying out the flipping operation for thus superposed and displayed folder icons $Fo_{10}$ to $Fo_{14}$, the operation of searching for a desired icon from among plural icons is made more intuitive and comprehensible. In addition, on the GUI screen 21, since icons indicative of the contents of folders corresponding to the respective superposed and displayed folder icons $Fo_{10}$ to $Fo_{14}$ are displayed below the respective folder icons $Fo_{10}$ to $Fo_{14}$ such that the icons are not superposed, even if the respective superposed and displayed folder icons $Fo_{10}$ to $Fo_{14}$ are not spread, it is possible to make the user visually confirm the contents of the folder icons $Fo_{10}$ to $Fo_{14}$.

Figure 15:
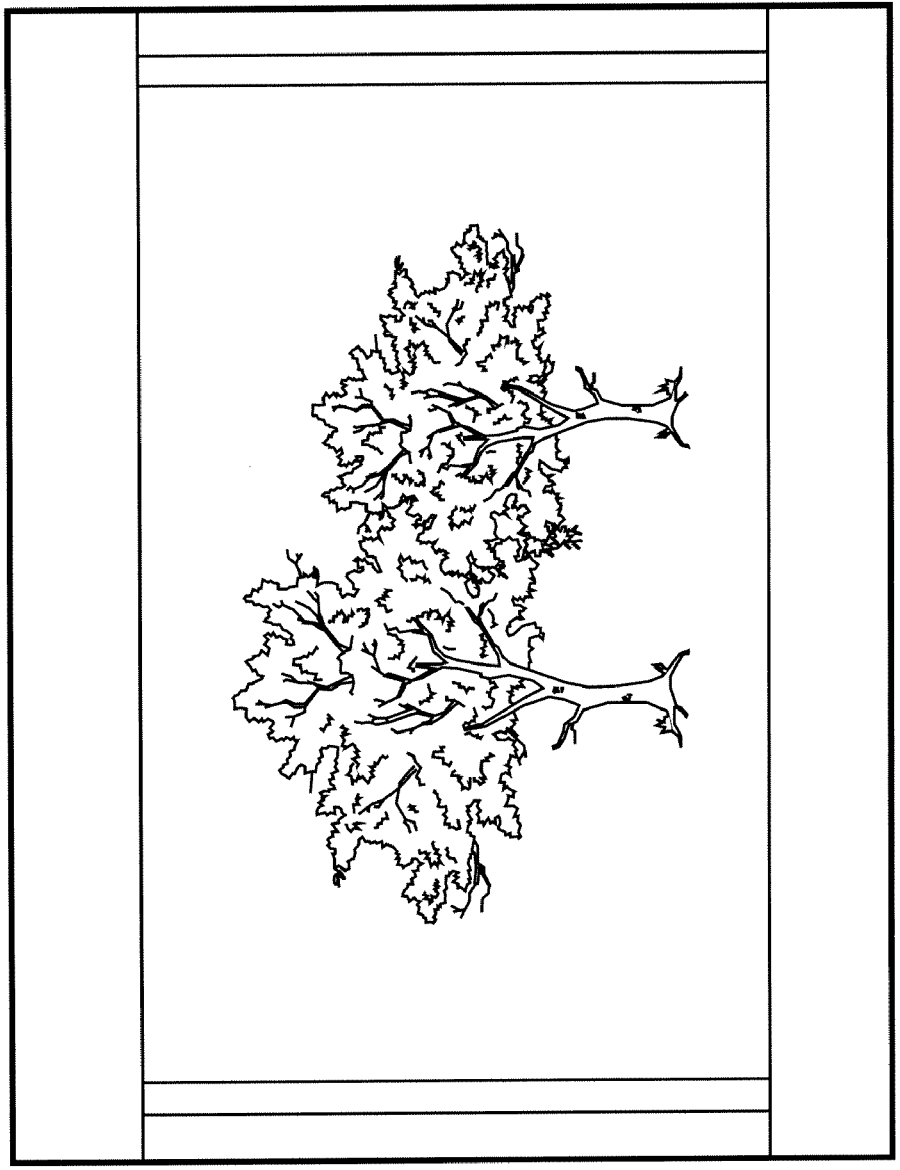
FIG. 15 shows a schematic view of a GUI screen in a file reproduction mode.

Furthermore, in above-described respective modes (over look mode, approach mode, folder detail mode), when it is recognized that an arbitrary file icon Fi is selected by the operation of a mouse, the CPU 2 transfers to a file reproduction mode. The contents displayed on the GUI screen 21 in the file reproduction mode are different depending on the kind of a file corresponding to the selected file icon Fi, and, for example, in case the selected file icon Fi is an icon corresponding to an image file, as shown in FIG. 15, on the GUI screen 21, an image based on the image file is displayed with its size set substantially equal with that of the GUI screen.

Figure 16:
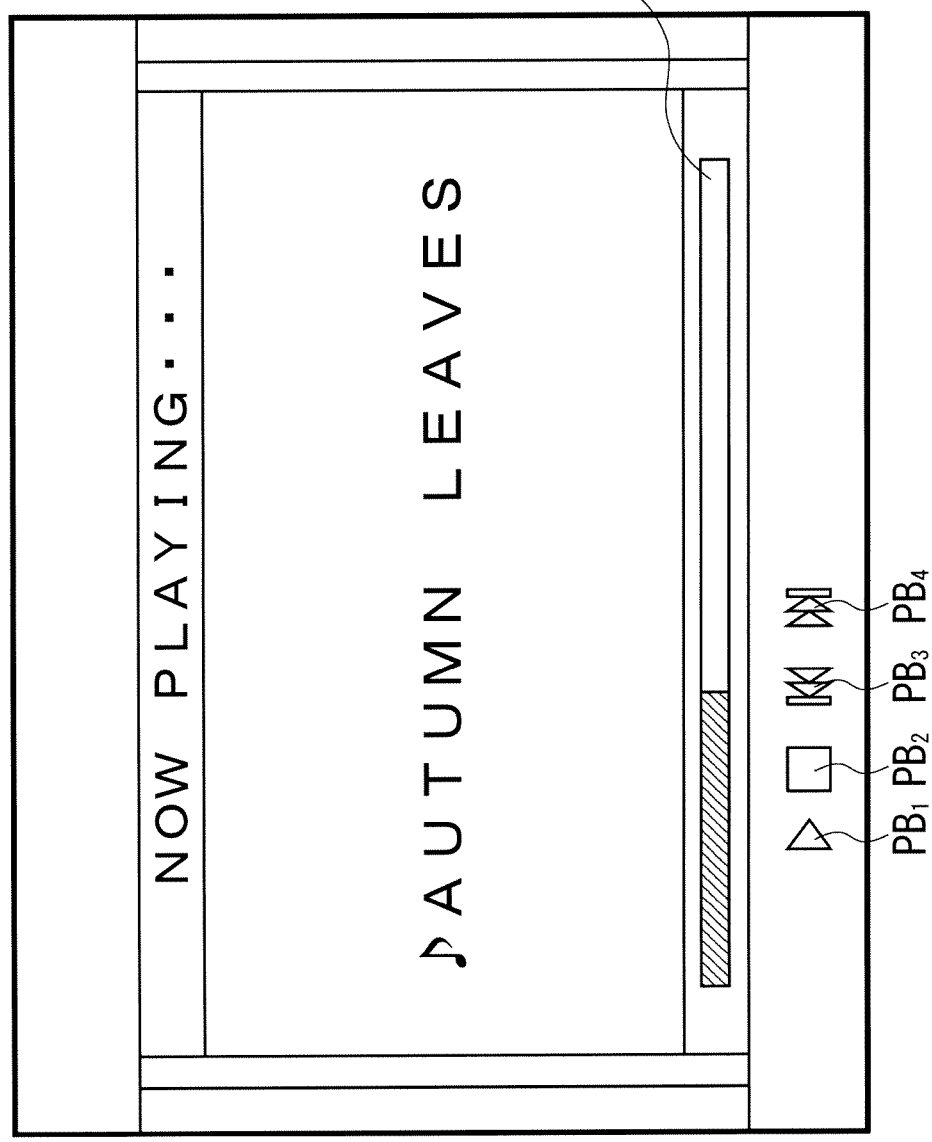
FIG. 16 shows a schematic view of a GUI screen in the file reproduction mode.

On the other hand, in case the selected file icon Fi is an icon corresponding to a music file, as shown in FIG. 16, on the GUI screen 21, a title of music based on the music file, playback control buttons $PB_1$ to $PB_4$ to perform the operation of playback, stop, rewind, fast-forward for the music file, a bar Ba that indicates the playback position of the music file which is being played back are displayed.

Figure 17:
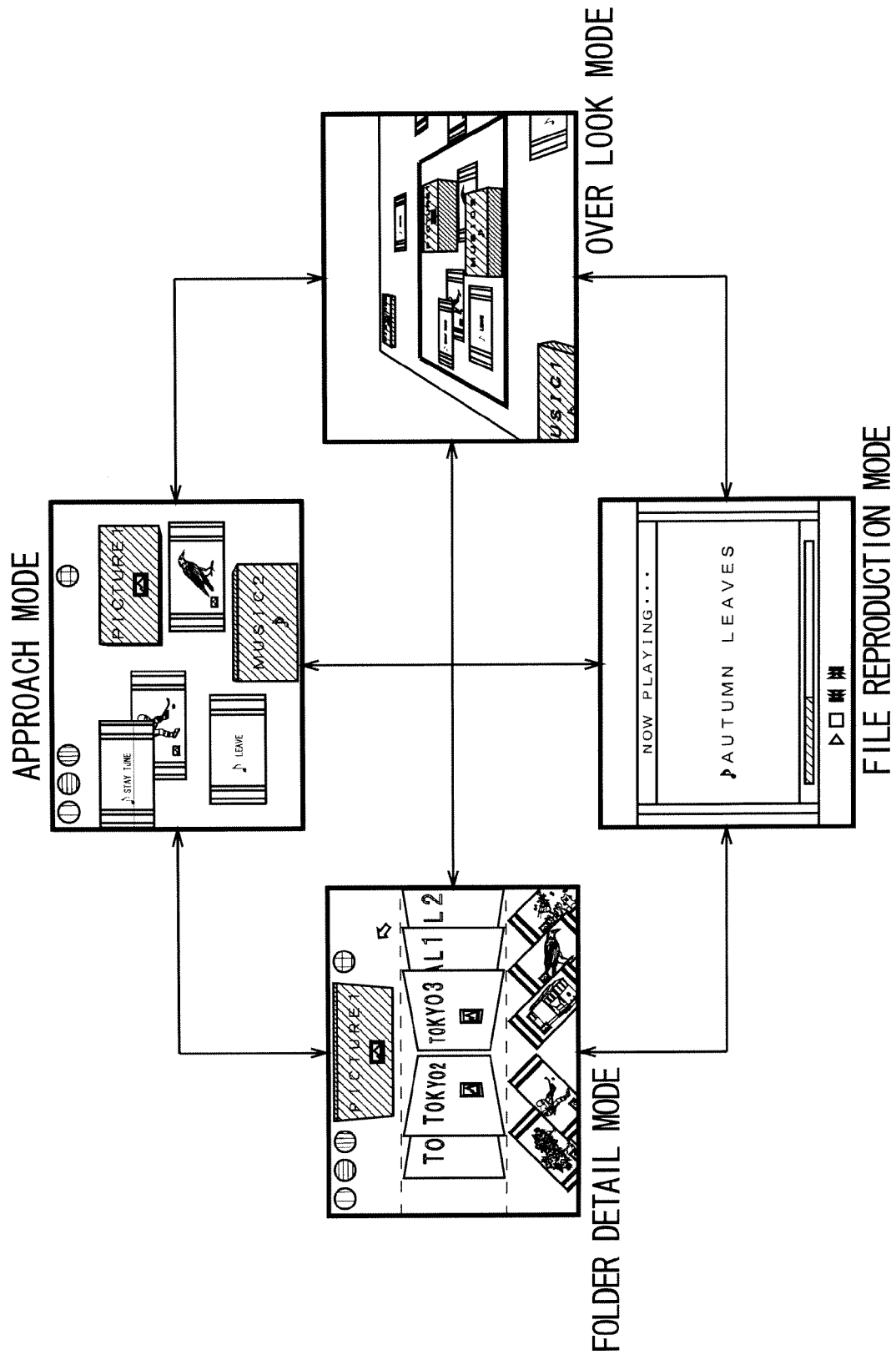
FIG. 17 shows a schematic view indicative of the switching transition among modes.

In this way, the CPU 2 has four modes or the over look mode, approach mode, folder detail mode, and file reproduction mode. Furthermore, these four modes can be freely switched by the operation of a mouse, as shown in FIG. 17.

Actually, the CPU 2 not only switches the mode from the over look mode to the approach mode, and from the approach mode to the folder detail mode, as have been described above, but also switches the mode from the approach mode to the over look mode in case the mouse button is clicked when the mouse cursor Cu is not superposed on icons in the approach mode, and from the over look mode to the folder detail mode in case the mouse button is clicked when the mouse cursor Cu is superposed on the folder icons Fo in the over look mode. That is, the respective modes can be switched under predetermined mouse operations.

(3) Performance Processing Sequence of Personal Computer

Figure 19:
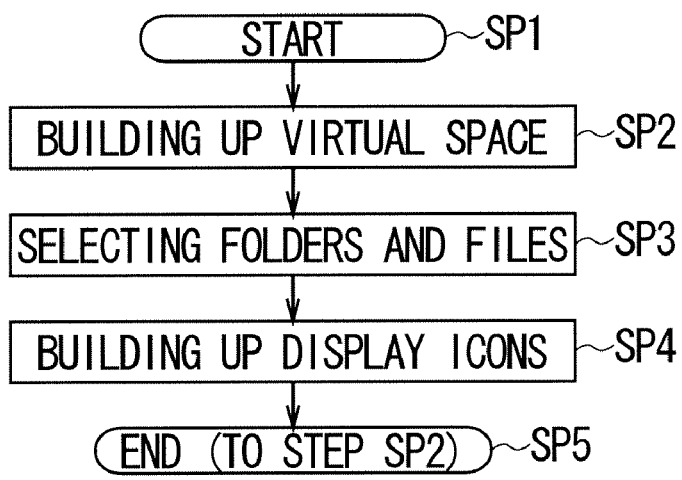
FIG. 19 shows a flowchart indicative of an initialization processing sequence.
Figure 20:
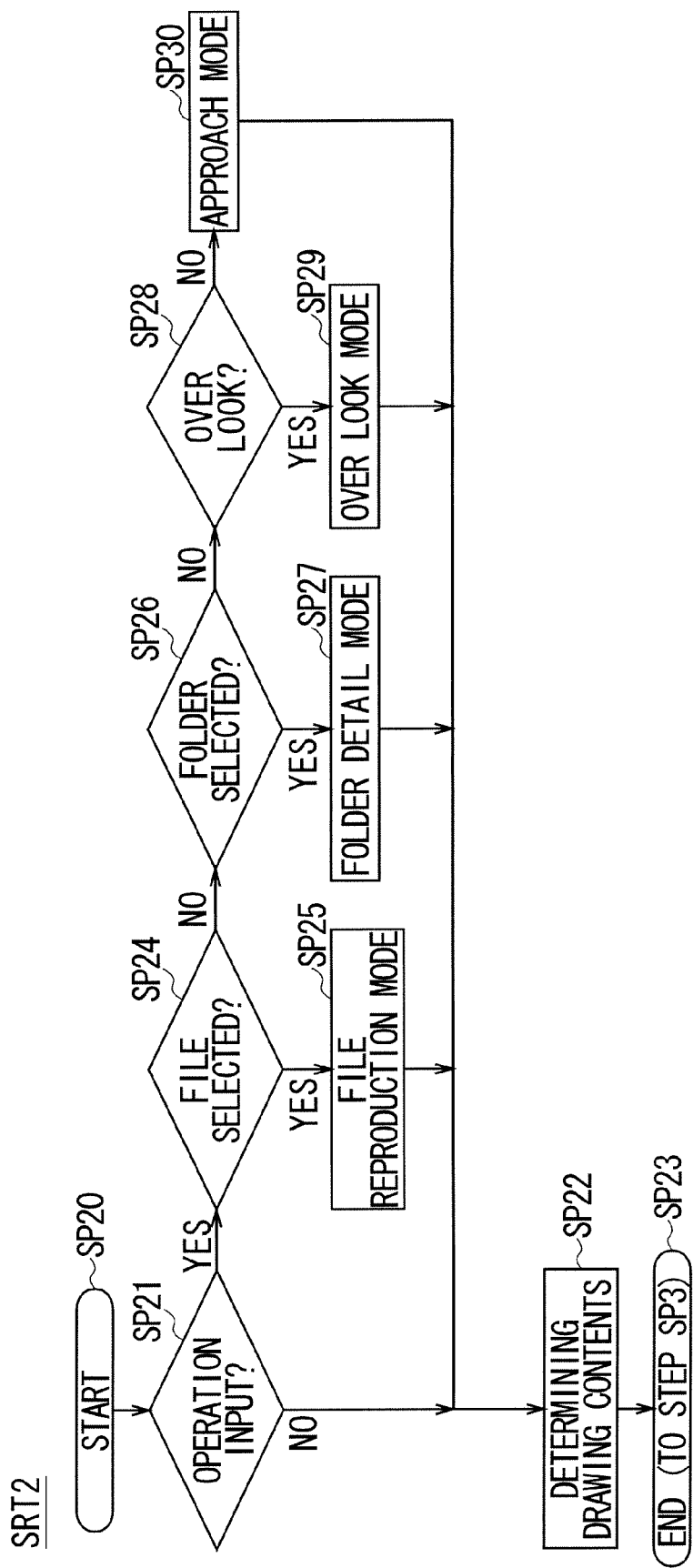
FIG. 20 shows a flowchart indicative of a drawing contents determination processing sequence.

Next, the performance processing sequence of a personal computer including the processing of above-described building up a three-dimensional space, displaying the GUI screen 21, switching the modes will be explained using flowcharts shown in FIG. 18 to FIG. 20. The performance processing sequence is executed in accordance with programs read out by the CPU 2 of the personal computer 1 from the hard disk drive 4 or ROM 5.

Figure 18:
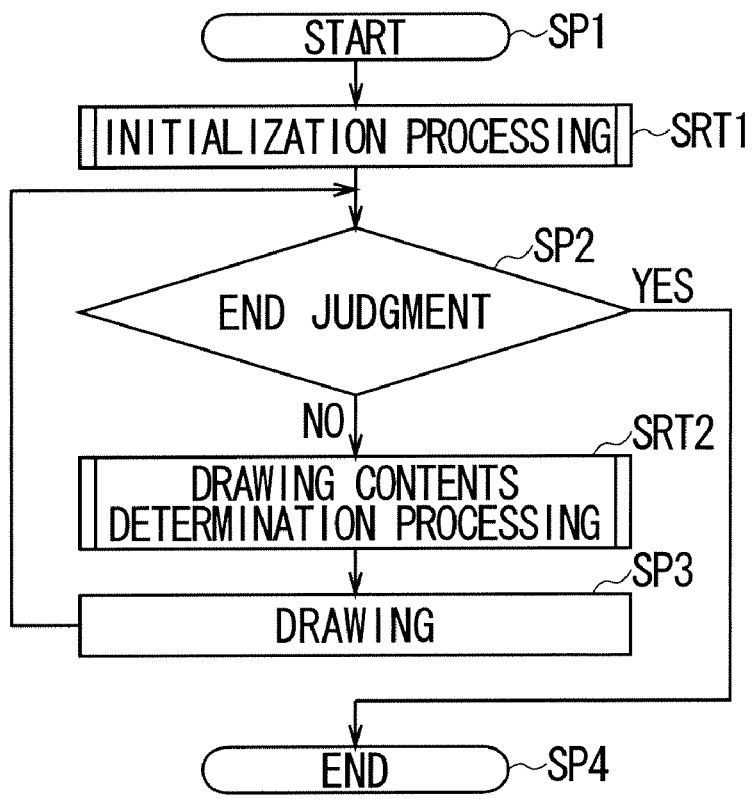
FIG. 18 shows a flowchart indicative of a performance processing sequence.

When the personal computer 1 is booted up, as shown in FIG. 18, the CPU 2 starts a performance processing sequence RT1 from the start step SP1, and transfers to a subroutine (also referred to as initialization routine, hereinafter) SRT1 shown in FIG. 19 for carrying out the initialization processing. The CPU 2 starts the initialization routine SRT1 from the start step SP10, going to the next step SP11.

In step SP11, the CPU 2 builds up the virtual three-dimensional space shown in FIG. 3, going to the next step SP12. In step SP12, the CPU 2 confirms the folder configuration in the personal computer 1, and selects plural folders and files randomly from among all the folders and all the files in the personal computer 1, going to the next step SP13.

In step SP13, after generating the plane surface 20 to be arranged in the three-dimensional space, and folder icons Fo and file icons Fi corresponding to the respective plural folders and files selected in the step SP12, the CPU 2 arranges the plural folder icons Fo and file icons Fi on the plane surface 20, going to the end step SP14 to end the initialization routine SRT1.

In this initialization routine SRT1, the three-dimensional space in which the plane surface 20, folder icons Fo, and file icons Fi, which are necessary for the GUI screen 21, are arranged is built up. Then, after ending the initialization routine SRT1, the CPU 2 transfers to step SP2 shown in FIG. 18 of the performance processing sequence RT1 being the main routine, and judges whether or not the end operation is carried out in step SP2.

In case the positive result is obtained in step SP2, the CPU 2 goes to the end step SP4 to end the performance processing sequence RT1. On the other hand, in case the negative result is obtained in step SP2, the CPU 2 continues the performance processing sequence RT1, and transfers to a subroutine (also referred to as drawing contents determination routine, hereinafter) SRT2 shown in FIG. 20 for carrying out the processing of determining the display contents (also referred to as drawing contents determination processing, hereinafter) of the GUI screen 21.

The CPU 2 starts the drawing contents determination routine SRT2 from the start step SP20, going to the next step SP21. In step SP21, the CPU 2 judges whether or not there is an operation input for the GUI screen 21. In this case, since the GUI screen 21 is not displayed, there is no operation input for the GUI screen 21, and the CPU 2 obtains the negative result in step SP21, going to the next step SP22. In step SP22, for example, the CPU 2 sets the display contents of the GUI screen 21 to the display contents shown in FIG. 6 in the over look mode, which is set up as the initial mode, going to the end step SP23 to end the drawing contents determination routine SRT2.

Then, the CPU 2 transfers to step SP3 shown in FIG. 18 of the performance processing sequence RT1 being the main routine, and, after displaying a GUI screen of the display contents (in this case, display contents in the over look mode) determined in the drawing contents determination routine SRT2 on the display unit 9 in step SP3, returns to step SP2 again.

The CPU 2 judges whether or not the end operation is carried out again in step SP2, and goes to the end step SP4 in case the positive result is obtained, while transfers to the drawing contents determination routine SRT2 again in case the negative result is obtained. The CPU 2 starts the drawing contents determination routine SRT2 from the start step SP20, going to the next step SP21. In step SP21, the CPU 2 judges whether or not there is an operation input for the GUI screen 21.

In this case, as described above, since the GUI screen 21 is displayed, there may be an operation input for the GUI screen 21. Accordingly, the CPU 2 obtains the positive result or the negative result instep SP21, going to step SP24 in case the positive result is obtained.

In step SP24, based on operation input information (position of the mouse cursor and whether or not the mouse button is clicked) obtained from the operation input unit 7, the CPU 2 judges whether or not a file icon Fi exists at the position of the mouse cursor when the mouse button is clicked. In case the positive result is obtained in step SP24, the CPU 2 recognizes that this file icon Fi is selected, going to step SP25. In step SP25, the CPU 2 sets the state of a file corresponding to the file icon Fi to the selected state, and sets the mode to the file reproduction mode, going to the next step SP22. On the other hand, in case the negative result is obtained in step SP24, the CPU 2 goes to step SP26.

In step SP26, based on operation input information, the CPU 2 judges whether or not a folder icon Fo exists at the position of the mouse cursor when the mouse button is clicked. In case the positive result is obtained in step SP26, the CPU 2 recognizes that this folder icon Fo is selected, going to step SP27. In step SP27, the CPU 2 sets the state of a folder corresponding to the folder icon Fo to the selected state, and sets the mode to the folder detail mode, going to the next step SP22. On the other hand, in case the negative result is obtained in step SP26, the CPU 2 goes to step SP28.

In step SP28, based on operation input information, the CPU 2 judges whether or not a specific mouse operation to switch the mode to the over look mode is carried out. In case the positive result is obtained in step SP28, the CPU 2 goes to step SP 29 to set the mode to the over look mode, going to the next step SP22. On the other hand, in case the negative result is obtained in step SP28, the CPU 2 sets the mode to the approach mode, going to the next step SP22.

In step SP22, in case the negative result is obtained in previous step SP21, the CPU 2 keeps the display contents of the GUI screen 21 intact as the display contents of the current mode, and in case of coming from step SP25, the CPU 2 sets the display contents of the GUI screen 21 to the display contents of the file reproduction mode, and in case of coming from step SP27, the CPU 2 sets the display contents of the GUI screen 21 to the display contents of the folder detail mode, and in case of coming from step SP29, the CPU 2 sets the display contents of the GUI screen 21 to the display contents of the over look mode, and in case of coming from step SP30, the CPU 2 sets the display contents of the GUI screen 21 to the display contents of the approach mode, and then the CPU 2 goes to step SP23, ending the drawing contents determination routine SRT2.

Then, the CPU 2 transfers to step SP3 shown in FIG. 18 of the performance processing sequence RT1 being the main routine, and, after displaying a GUI screen of the display contents determined in the drawing contents determination routine SRT2 on the display unit 9 in step SP3, returns to step SP2 again. Afterward, until the positive result is obtained in step SP2, that is, until the end operation is carried out, step SP2, drawing contents determination routine SRT2, and step SP3 are repeatedly executed.

In accordance with the performance processing sequence RT1, the CPU 2 builds up the virtual three-dimensional space, displays the GUI screen 21, switches the modes, etc.

Figure 21:
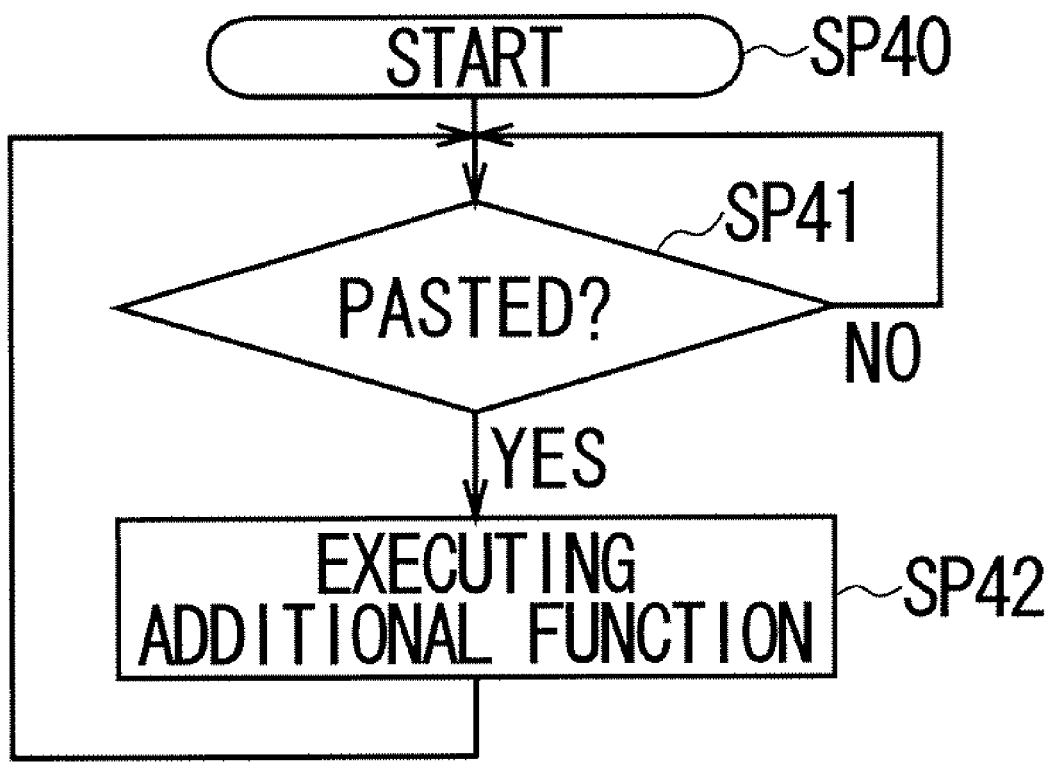
FIG. 21 shows a flowchart indicative of an additional function execution processing sequence.

Next, an additional function execution processing sequence when an additional function icon is pasted to a folder icon Fo or file icon Fi in the approach mode and in the folder detail mode will be explained using a flowchart shown in FIG. 21.

When it is recognized that the mode transfers to the approach mode or folder detail mode, the CPU 2 starts an additional function execution sequence RT2 from the start step SP40, going to step SP41. In step SP 41, the CPU 2 waits for an additional function icon to be pasted, and when it is recognized that the additional function icon is pasted, the CPU 2 goes to step SP42.

In step SP42, after executing an additional function allocated to the additional function icon for a folder icon Fo or file icon Fi to which the additional function icon is pasted, the CPU 2 returns to step SP41 again, waiting for an additional function icon to be pasted.

In accordance with the additional function execution sequence RT2, the CPU 2 executes an additional function allocated to an additional function icon.

(4) Performance and Effect

In above-described configuration, on the plane surface 20 simulating a desk formed in a virtual three-dimensional space, the CPU 2 of the personal computer 1 arranges the folder icons Fo simulating books corresponding to respective folders in the personal computer 1 and the file icons Fi simulating papers corresponding to respective files in the personal computer 1. Then, the CPU 2 converts the virtual three-dimensional space to a three-dimensional image, and displays thus converted three-dimensional image on the display unit 9 as the GUI screen 21 (over look mode or approach mode).

Accordingly, the CPU 2 can make the user operate the folders (for example, selecting, copying, and deleting folders) as well as operate the files (for example, selecting, copying, and deleting files) with a sense of dealing with books and papers on a actual desk, which can realize a GUI that is more intuitive and comprehensible as compared with the conventional GUI.

Furthermore, when it is recognized that any one of the folder icons Fo arranged on the plane surface 20 is selected, the CPU 2 displays the details of a folder corresponding to thus selected folder icon Fo on the GUI screen 21 (folder detail mode).

At this time, on the GUI screen 21, since the CPU 2 superposes and displays plural folder icons Fo corresponding to respective plural folders stored directly under a folder corresponding to the selected folder icon Fo like pages of a book, and shifts and displays an arbitrary folder icon Fo among the plural folder icons Fo such that the folder icon Fo is spread by performing the flipping operation for thus superposed and displayed plural folder icons Fo, the operation of searching for a desired folder icon Fo from among the plural folder icons Fo can be made more intuitive and comprehensible with a sense of flipping a page of a book.

Furthermore, at this time, since the CPU 2 displays file icons Fi indicative of the contents of folders corresponding to the respective plural folder icons Fo, which are superposed and displayed like pages of a book, under the respective plural folder icons Fo such that the file icons Fi are not superposed, even if the respective plural folder icons Fo which are superposed and displayed like pages of a book are not spread, the user can visually confirm the contents of the respective folder icons Fo.

According to above-described configuration, since the personal computer 1 mutually superposes and displays icons of respective plural files and folders on the display unit 9, and shifts an arbitrary icon among thus superposed and displayed plural icons such that a page of a book is spread to display the icon on the display unit 9 by performing a predetermined operation for the superposed and displayed plural icons, the operation of searching for a desired icon from among the plural icons can be made more intuitive and comprehensible with a sense of flipping a page of a book. Furthermore, since the personal computer 1 displays, other than thus superposed and displayed plural icons, plural icons indicative of the contents of files and folders corresponding to the respective superposed and displayed icons on the display unit 9 such that the contents thereof can be visually confirmed, even if the superposed and displayed respective plural icons are not shifted to be displayed such that the icons are spread, the user can visually confirm the contents of the respective icons, which makes it possible to easily search for an icon of a desired file or folder, and easily search for desired data consequently.

(5) Other Embodiments

In the first embodiment, in the folder detail mode, in case plural folders are stored directly under a folder corresponding to a selected folder icon Fo, plural folder icons Fo corresponding to the respective plural folders are superposed and displayed on the middle part 21B like pages of a book, and icons (file icons Fi corresponding to one of files stored directly under the respective folders) indicative of the contents of folders corresponding to the respective plural folder icons Fo are displayed on the lower part 21C such that the file icons Fi are not superposed. On the other hand, for example, in case there are not stored plural folders but stored plural files directly under a folder corresponding to a selected folder icon Fo, the following configuration may be employed.

Figure 22:
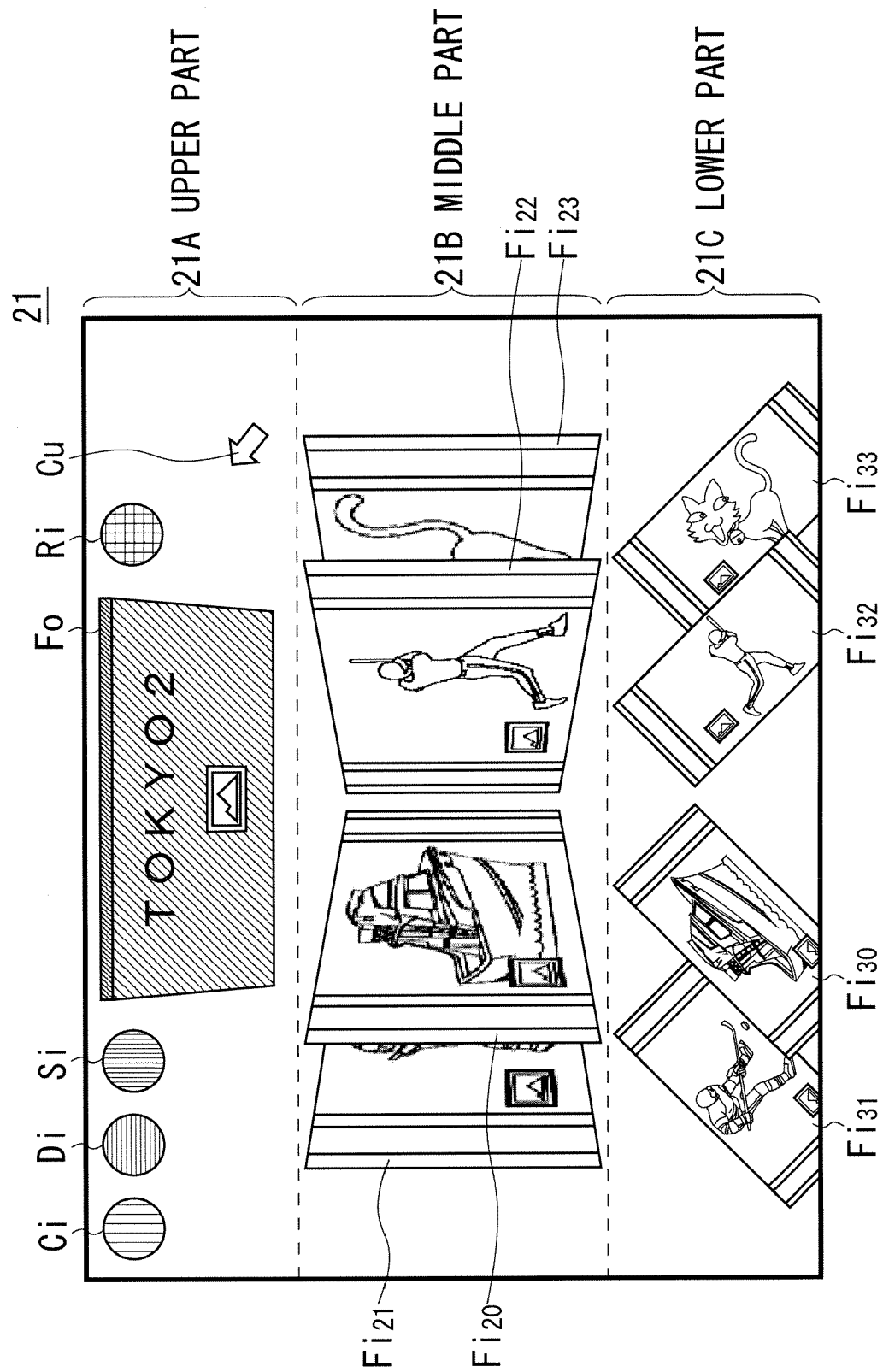
FIG. 22 shows a schematic view of a GUI screen in the folder detail mode in another embodiment.

That is, in this case, as shown in FIG. 22, the personal computer 1 superposes and displays plural file icons Fi (for example, file icons $Fi_{20}$, $Fi_{21}$, $Fi_{22}$, and $Fi_{23}$) corresponding to respective plural files stored directly under a folder corresponding to the selected folder icon Fo on the middle part 21B like pages of a book, and displays icons indicative of the contents of files corresponding to the respective plural file icons Fi on the lower part 21C such that the icons are not superposed. The icons indicative of the contents of files are, for example, file icons Fi (for example, file icons $Fi_{30}$, $Fi_{31}$, $Fi_{32}$, and $Fi_{33}$) which are obtained by reducing the display size of the respective plural file icons Fi displayed on the middle part 21B.

In this way, even if the respective plural file icons Fi which are superposed and displayed like pages of a book are not spread, the personal computer 1 can make the user visually confirm the contents of the respective file icons Fi.

Figure 23:
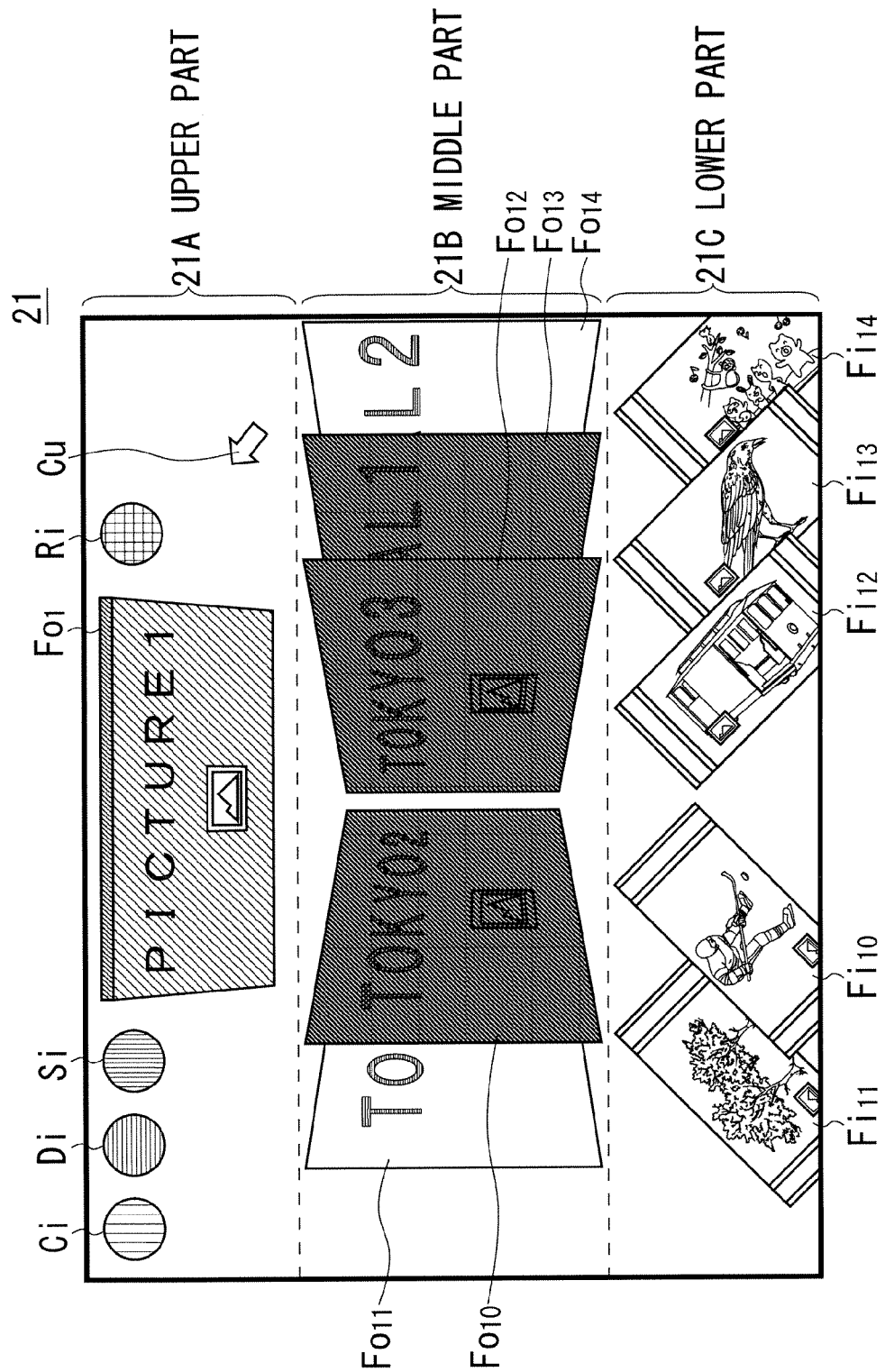
FIG. 23 shows a schematic view of a GUI screen in the folder detail mode in yet another embodiment.

Furthermore, in above-described configuration, in the folder detail mode, the plural folder icons Fo corresponding to respective plural folders stored directly under a folder corresponding to the selected folder icon Fo are superposed and displayed on the middle part 21B like pages of a book. On the other hand, at this time, as shown in FIG. 23, thus superposed respective folder icons Fo may be displayed translucently. In this way, the user can visually confirm the contents of corresponding folders from the folder icons Fo displayed on the middle part 21B to some extent.

Furthermore, in above-described configuration, in the folder detail mode, the plural folder icons Fo corresponding to respective plural folders stored directly under a folder corresponding to the selected folder icon Fo are displayed in the forms simulating papers (that is, forms simulating pages of a book). On the other hand, the present invention is not restricted to this, and the plural folder icons Fo having a thickness may be displayed similar to the case in the over look mode and the case in the approach mode.

Figure 24:
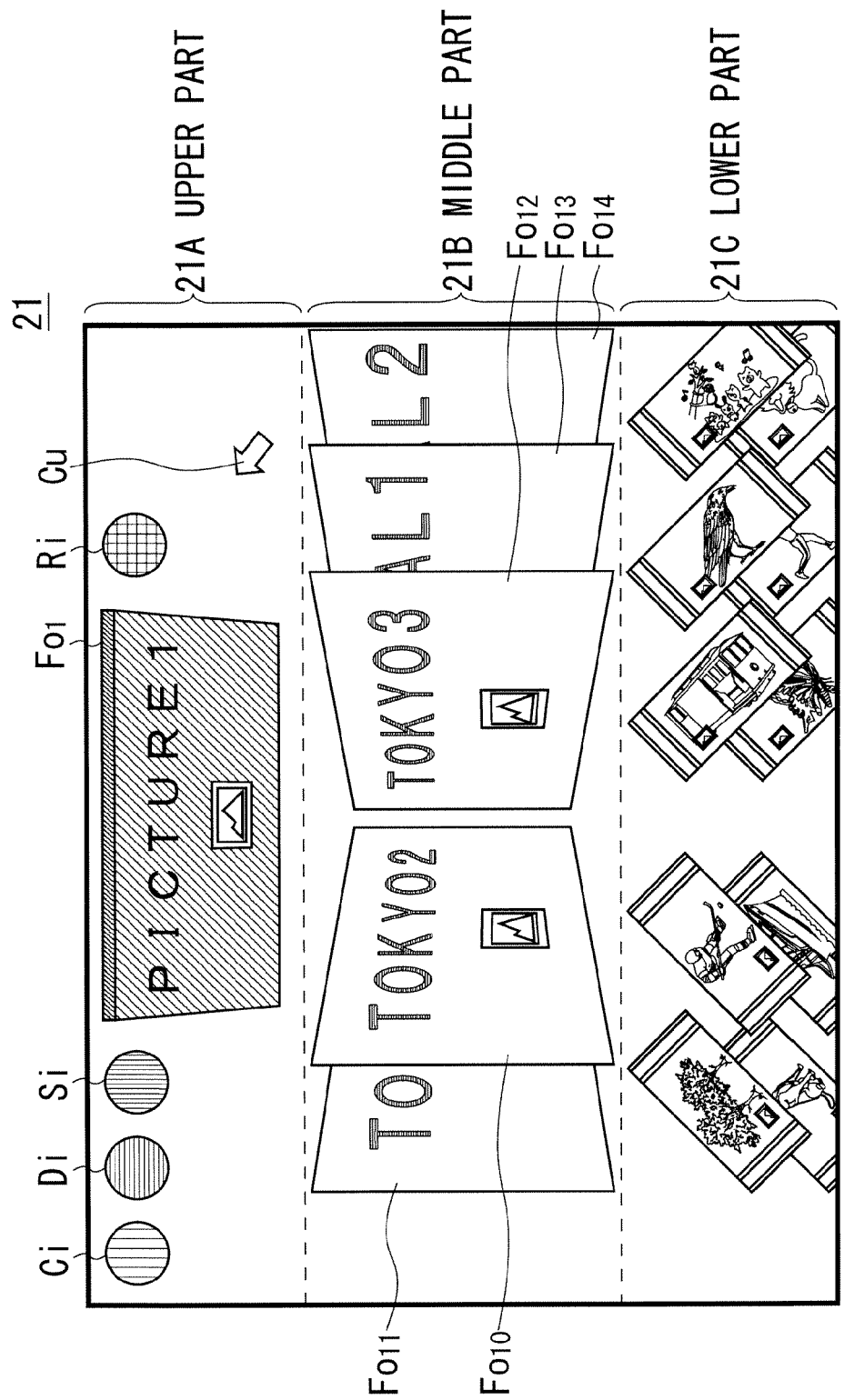
FIG. 24 shows a schematic view of a GUI screen in the folder detail mode in yet another embodiment.

Furthermore, in above-described configuration, in the folder detail mode, as icons indicative of the contents of folders corresponding to the respective plural folder icons Fo displayed on the middle part 21B, file icons Fi corresponding to one of plural files stored directly under (that is, a lower layer by one) a folder are displayed on the lower part 21C. On the other hand, the present invention is not restricted to this, and as icons indicative of the contents of folders, two or more among the folder icons Fo or the file icons Fi corresponding to respective plural files stored directly under (that is, a lower layer by one) a folder may be arrayed and displayed on the lower part 21C in the longitudinal direction, as shown in FIG. 24.

Figure 25:
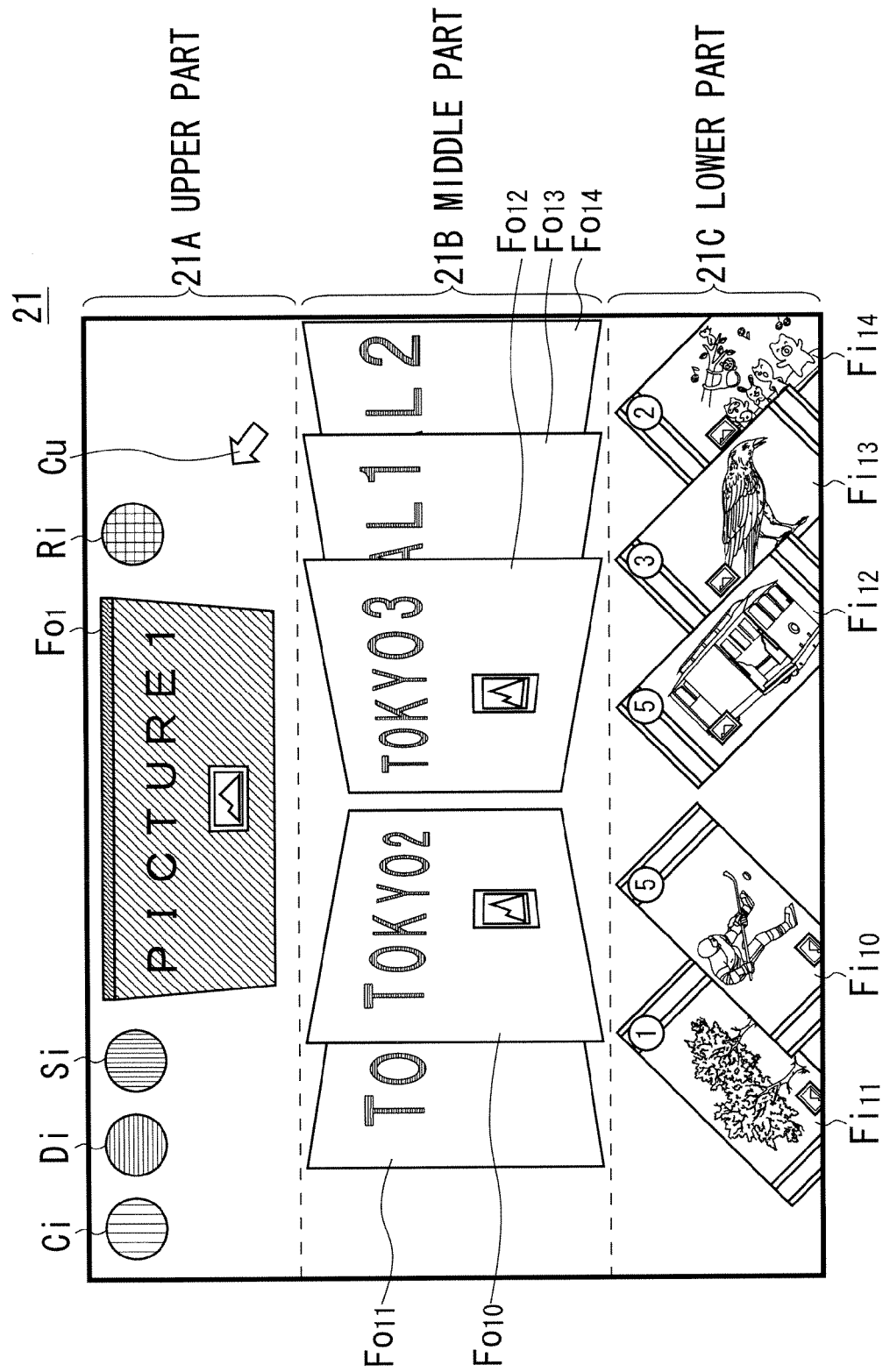
FIG. 25 shows a schematic view of a GUI screen in the folder detail mode in yet another embodiment.
Figure 26:
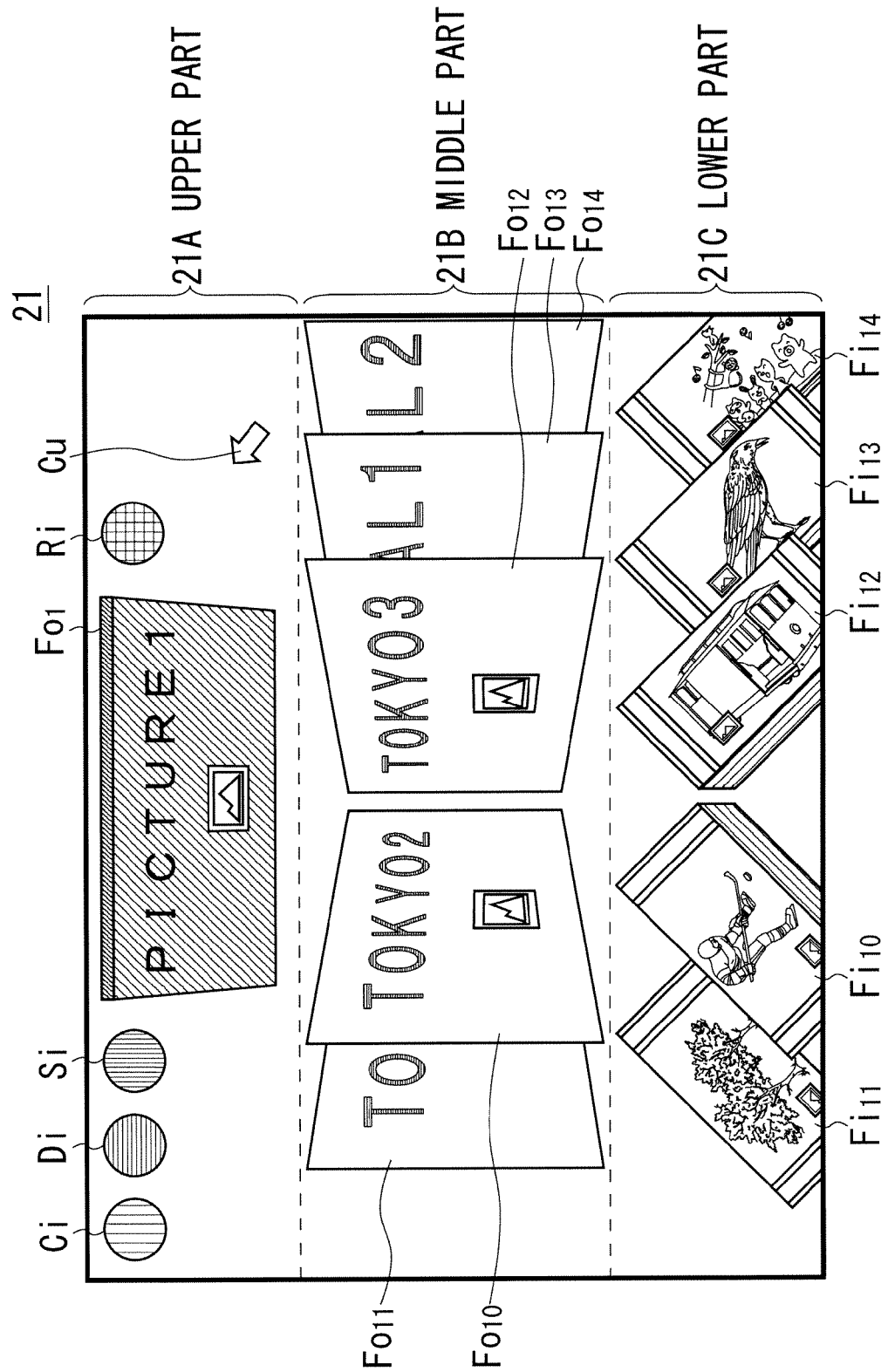
FIG. 26 shows a schematic view of a GUI screen in the folder detail mode in yet another embodiment.

Furthermore, for example, as shown in FIG. 25, to the surface of the file icons Fi displayed on the lower part 21C as icons indicative of the contents of folders corresponding to the respective plural folder icons Fo displayed on the middle part 21B, the number of files stored under the same folder may be attached. In this way, the user can recognize the number of files stored under the respective folders. Moreover, for example, the file icons Fi may not only have attached to the surface thereof the number of files, but also have thickness according to the number of files to be displayed, as shown in FIG. 26.

Furthermore, in above-described configuration, the plural file icons Fi displayed on the lower part 21C have their sizes made small and are inclined by 45 degrees such that the file icons Fi are not superposed one another. On the other hand, the present invention is not restricted to this, and the plural file icons Fi may be superposed one another to a certain degree so long as the contents of the files attached to the surface of the plural file icons Fi can be visually confirmed, and only reducing the size or only inclining the direction may be employed. At this time, the reduction ratio and the inclination angle are freely set up so long as the contents of the files attached to the surface of the plural file icons Fi can be visually confirmed.

Furthermore, in above-described configuration, on the GUI screen 21 in the approach mode and in the folder detail mode, the additional function icons are displayed. On the other hand, the present invention is not restricted to this, and the additional function icons may be displayed on the GUI screen 21 in the over look mode so that additional functions can be executed in the over look mode.

Furthermore, in above-described configuration, various operations such as the pasting operation and flipping operation with respect to the folder icons Fo or file icons Fi are performed by a predetermined mouse operation. On the other hand, the present invention is not restricted to this, and the various operations may be performed by other mouse operations different from the predetermined mouse operation explained in above-described embodiments, or may be performed by a keyboard operation, or, furthermore, may be performed by the operation of various operation input devices (for example, touch pen, touch panel, joystick) other than a mouse or keyboard.

Furthermore, in above-described configuration, as the additional function icons, the copy icon Ci, delete icon Di, shortcut icon Si, and range icon Ri are displayed on the GUI screen 21. On the other hand, the present invention is not restricted to this, and icons to which various other functions are allocated such as a compression icon to which the compression function for a file is allocated, a decompression icon to which the decompression function for a compressed file is allocated, a lock icon to which the lock function of preventing a file from being deleted is allocated may be displayed on the GUI screen 21 as additional function icons.

Furthermore, in above-described configuration, the additional function icon is pasted to the folder icons Fo or file icons Fi, and the additional function icon is made to return to the original position after the additional function is executed. On the other hand, the present invention is not restricted to this, and the additional function icon may stay at the position where the additional function icon is pasted.

Furthermore, in above-described configuration, the present invention is applied to the personal computer 1 as an information processing apparatus. On the other hand, the present invention is not restricted to this, and the present invention may be applied to other various information processing apparatuses so long as the information processing apparatuses are apparatuses which deal with plural data such as a hard disk recorder or DVD recorder that deals with plural image data, and an audio player that deals with plural music data.

Furthermore, in above-described configuration, the CPU 2 of the personal computer 1 executes above-described processing sequence in accordance with programs installed in the hard disk drive 4 or ROM 5. On the other hand, the present invention is not restricted to this, and, recording programs for executing the processing sequence to a recording medium such as a Compact Disc (CD) in advance, the processing sequence may be carried out by reading out the programs from the recording medium, or the processing sequence may be carried out by downloading such programs from a server on a predetermined network.

Furthermore, in above-described embodiments, the personal computer 1 as an information processing apparatus is configured by the CPU 2 and the display controller 8 as a display controller for mutually superposing and displaying the plural file icons Fi and folder icons Fo as selection item display elements indicative of files and folders on the display unit 9 with the files and folders being selection items, and displaying the folder icons Fo and file icons Fi as item contents display elements indicative of the contents of files and folders corresponding to the respective plural file icons Fi and folder icons Fo on the display unit 9 such that the contents of the files and folders are visually confirmed, and the operation input unit 7 as an operation unit for carrying out a predetermined operation for the superposed and displayed plural file icons Fi and folder icons Fo. On the other hand, the present invention is not restricted to this, and the personal computer 1 may be configured by other various configurations so long as the personal computer 1 is provided with similar functions. The display unit 9 may be directly arranged on the personal computer 1 such as that of a notebook-type personal computer, or may be connected to the personal computer 1 through a cable.

Accordingly, the present invention can be widely applied to information processing apparatuses which deal with plural data.

It should be understood by those skilled in the art that various modifications, combinations sub-combinations and alterations may occur depending on design requirements and other factors insofar as they are within the scope of the appended claims or the equivalents thereof.

What is claimed is:

1. An information processing apparatus, comprising:
display control means for superposing and displaying a plurality of selection item display elements indicative of a plurality of selection items respectively on a display unit, said selection items corresponding to a plurality of data and respective logical storage locations for the plurality of data, and displaying a plurality of item contents display elements indicative of the contents of the selection items on the display unit such that the contents can be visually confirmed, wherein the display control means displays the plurality of selection item display elements on the display unit in the form of an open book with the plurality of selection item display elements corresponding to individual pages of the open book; and
operation means for carrying out a predetermined operation for the superposed and displayed plural selection item display elements;
wherein the display control means shifts a display of a selection item display element among the superposed and displayed plural selection item display elements, based on the predetermined operation by the operation means, in the form of shifting a position of a page in the open book,
wherein the plurality of item contents display elements are displayed in a separate region of the display unit from the plurality of selection item display elements, and are displayed within the separate region in a horizontally spread manner such that a horizontal position of each item contents display element is the same as a horizontal position of its respective selection item display element on the display unit such that each displayed item contents display element is displayed in a one-to-one correspondence with the displayed selection item display element for which it indicates the contents thereof.

2. The information processing apparatus as set forth in claim 1, wherein
the display control means displays the item contents display elements close to the display position for the selection item display elements.

3. The information processing apparatus as set forth in claim 1, wherein
the display control means displays the item contents display elements such that the item contents display elements are not superposed on one another.

4. The information processing apparatus as set forth in claim 3, wherein
the display control means sets up the display size of the item contents display elements such that the item contents display elements are not superposed on one another.

5. The information processing apparatus as set forth in claim 3, wherein
the display control means sets up the display direction of the item contents display elements such that the item contents display elements are not superposed on one another.

6. The information processing apparatus as set forth in claim 3, wherein
the display control means sets up the display size and the display direction of the item contents display elements such that the item contents display elements are not superposed on one another.

7. The information processing apparatus as set forth in claim 1, wherein
the display control means shifts and displays an item contents display element according to the shifting of the shifted selection item display element.

8. An information processing method, implemented on an information processing apparatus, comprising:
superposing and displaying a plurality of selection item display elements indicative of a plurality of selection items respectively on a display unit of the information processing apparatus, said selection items corresponding to a plurality of data and respective logical storage locations for the plurality of data, and displaying a plurality of item contents display elements indicative of the contents of the selection items on the display unit such that the contents can be visually confirmed, wherein the plurality of selection item display elements are displayed on the display unit in the form of an open book with the plurality of selection item display elements corresponding to individual pages of the open book; and
when a predetermined operation is carried out for the superposed and displayed plural selection item display elements by an operation section of the information processing apparatus, shifting a display of a selection item display element among the superposed and displayed plural selection item display elements based on the predetermined operation, in the form of shifting a position of a page in the open book,
wherein the plurality of item contents display elements are displayed in a separate region of the display unit from the plurality of selection item display elements, and are displayed within the separate region in a horizontally spread manner such that a horizontal position of each item contents display element is the same as a horizontal position of its respective selection item display element on the display unit such that each displayed item contents display element is displayed in a one-to-one correspondence with the displayed selection item display element for which it indicates the contents thereof.

9. A non-transitory computer readable storage medium encoded with computer executable instructions, which when executed by an information processing apparatus, cause the information processing apparatus to perform a method comprising:
superposing and displaying a plurality of selection item display elements indicative of a plurality of selection items respectively on a display unit of the information processing apparatus, said selection items corresponding to a plurality of data and respective logical storage locations for the plurality of data, and displaying a plurality of item contents display elements indicative of the contents of the selection items on the display unit such that the contents can be visually confirmed, wherein the plurality of selection item display elements are displayed on the display unit in the form of an open book with the plurality of selection item display elements corresponding to individual pages of the open book; and
when a predetermined operation is carried out for the superposed and displayed plural selection item display elements by an operation section of the information processing apparatus, shifting a display of a selection item display element among the superposed and displayed plural selection item display elements based on the predetermined operation, in the form of shifting a position of a page in the open book,
wherein the plurality of item contents display elements are displayed in a separate region of the display unit from the plurality of selection item display elements, and are displayed within the separate region in a horizontally spread manner such that a horizontal position of each item contents display element is the same as a horizontal position of its respective selection item display element on the display unit such that each displayed item contents display element is displayed in a one-to-one correspondence with the displayed selection item display element for which it indicates the contents thereof.

10. An information processing apparatus, comprising:
a display controller that superposes and displays a plurality of selection item display elements indicative of a plurality of selection items respectively on a display unit, said selection items corresponding to a plurality of data and respective logical storage locations for the plurality of data, and displays a plurality of item contents display elements indicative of the contents of the selection items on the display unit such that the contents can be visually confirmed, wherein the display controller displays the plurality of selection item display elements on the display unit in the form of an open book with the plurality of selection item display elements corresponding to individual pages of the open book; and
an operation unit that carries out a predetermined operation for the superposed and displayed plural selection item display elements;
wherein the display controller shifts a display of a selection item display element among the superposed and displayed plural selection item display elements based on the predetermined operation by the operation unit, in the form of shifting a position of a page in the open book,
wherein the plurality of item contents display elements are displayed in a separate region of the display unit from the plurality of selection item display elements, and are displayed within the separate region in a horizontally spread manner such that a horizontal position of each item contents display element is the same as a horizontal position of its respective selection item display element on the display unit such that each displayed item contents display element is displayed in a one-to-one correspondence with the displayed selection item display element for which it indicates the contents thereof.

11. The information processing apparatus as set forth in claim 1, wherein the display control means displays the plurality of selection display elements on the display unit in the form of an open book by displaying two of the plurality of selection display elements adjacently to each other and completely visible on the display unit, while partially displaying at least one of the remaining plurality of selection display elements to appear superposed by a respective one of the two completely visible selection display elements on the display unit, with only a portion of the at least one of the remaining plurality of selection display elements visible near one side of the respective one of the two completely visible selection display elements.

12. The information processing apparatus as set forth in claim 1, wherein each of the plurality of item contents display elements includes an image indicative of the contents of a respective selection item.

* * * * *